United States Patent
McIntosh

(10) Patent No.: US 12,312,097 B2
(45) Date of Patent: May 27, 2025

(54) HYBRID BARRIER FOR AIRCRAFT CABIN

(71) Applicant: The Boeing Company, Arlington, VA (US)

(72) Inventor: Darren Carl McIntosh, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 118 days.

(21) Appl. No.: 18/336,336

(22) Filed: Jun. 16, 2023

(65) Prior Publication Data
US 2024/0417076 A1    Dec. 19, 2024

(51) Int. Cl.
*B64D 45/00* (2006.01)
*B64D 11/00* (2006.01)
*B64D 11/04* (2006.01)

(52) U.S. Cl.
CPC .......... *B64D 45/0026* (2019.08); *B64D 11/04* (2013.01); *B64D 11/0023* (2013.01)

(58) Field of Classification Search
CPC .......................... B64D 11/0023; B64D 11/04; B64D 45/0026; E05C 7/005; E06B 7/03; E06B 3/7009
See application file for complete search history.

(56) References Cited

U.S. PATENT DOCUMENTS

| | | |
|---|---|---|
| 5,285,596 A | 2/1994 | Kinsey |
| 6,783,098 B1 | 8/2004 | Chavez |
| 9,428,940 B1 | 8/2016 | Patrick |
| 11,208,744 B2 | 12/2021 | Urbelis |
| 2016/0083092 A1 | 3/2016 | Long et al. |
| 2017/0341750 A1 | 11/2017 | Gonnsen |
| 2018/0099762 A1* | 4/2018 | Maclean ............ B64D 45/0021 |
| 2018/0265216 A1 | 9/2018 | Breigenzer |
| 2018/0346091 A1 | 12/2018 | Movsesian et al. |
| 2020/0115029 A1 | 4/2020 | Movsesian et al. |
| 2020/0131842 A1* | 4/2020 | Thomas .................... E06B 9/52 |
| 2020/0223557 A1* | 7/2020 | Maclean ................ B64D 11/04 |

FOREIGN PATENT DOCUMENTS

| | | |
|---|---|---|
| CN | 212614220 U | 2/2021 |
| EP | 2796370 A1 | 10/2014 |
| EP | 2851296 A1 | 3/2015 |
| EP | 3552963 A1 | 10/2019 |

(Continued)

OTHER PUBLICATIONS

EP Search Report mailed Jul. 24, 2024 in re EP Application No. 24167937.2.

(Continued)

*Primary Examiner* — Kimberly S Berona
*Assistant Examiner* — Katherine June Walter
(74) *Attorney, Agent, or Firm* — COATS & BENNETT, PLLC

(57) ABSTRACT

A hybrid aircraft barrier that is configured to deploy in a vehicle cabin from an initial stowed position as an aircraft cabin monument component into a deployed position converting the aircraft cabin monument component into an aircraft cabin lockable barrier to prevent passengers from moving along an aisle in a vehicle cabin into a vehicle area forward of the lockable barrier.

18 Claims, 17 Drawing Sheets

(56) References Cited

FOREIGN PATENT DOCUMENTS

| | | | |
|---|---|---|---|
| EP | 3741676 A1 | 11/2020 | |
| GB | 2307712 A | 6/1997 | |

OTHER PUBLICATIONS

EP Search Report mailed Aug. 26, 2024 in re EP Application No. 24165860.8.

Federal Aviation Administration, "AC 120-110—Aircraft Secondary Barriers and Alternate Flight Deck Security Procedures", U.S. Department of Transportation, Apr. 14, 2015, pp. 1-5.

Hexarmor, "SuperFabric cut protection, HexArmor with cut-resistant SuperFabric inside", Jan. 1, 2023, pp. 1-2.

Aitex, "Anti-Vandal Upholstery Resistant to Cuts by Stabs and Arson", retrieved from the internet: URL: https://www.aitex.es/tapicerias-antivandalicas/ [retrieved on May 2, 2023]; pp. 1-5.

Cut-Tex Pro, "The Ultimate Cut Protection—Technical Data Sheet", Jan. 1, 2023, pp. 1-3.

Peppermill Home, "Spectrum Via 36x80 Vinyl Folding Door", Jan. 1, 2023, pp. 1-5.

Wheatbelt, Inc., "Two New Rolling Shutter Slats from Wheatbelt, Inc." Jan. 1, 2023, pp. 1-5.

Wheatbelt, Inc., "Rolling Shutter Manufacturing in Hillsboro, KS", retrieved from the internet: URL: https://www.rollupshutter.com [retrieved on Jun. 15, 2023], pp. 1.

Roll-a-Shield, "RAS-section-view-of-slats", retrieved from the internet: URL: https://rollashield.com/shutters/ras-section-view-of-slats/ [retrieved on Jun. 15, 2023], pp. 1-2.

Cut-Tex Pro, "Cut Resistant Fabric for Clothing & Workwear (Cut Level 5)", retrieved from the internet: URL: https://cut-tex.com/ [retrieved on Jun. 15, 2023], pp. 1-25.

Aitex, "Vandal Proof Upholstery Which Can Withstand Slashing and Burning", retrieved from the internet: URL: https://www.aitex.es/tapicerias-antivandalicas/?lang=en [retrieved on Jun. 15, 2023], pp. 1-5.

Hexarmor, "Global Leader in Personal Protective Equipment", retrieved from the internet: URL: https://www.hexarmor.com/ [retrieved on Jun. 15, 2023], pp. 1-5.

Kozane, "High-performance and cut-resistant fabrics for outstanding protection and wearability", retrieved from the internet: URL: https://www.kozaneprotection.com/ [retrieved on Jun. 15, 2023], pp. 1-6.

\* cited by examiner

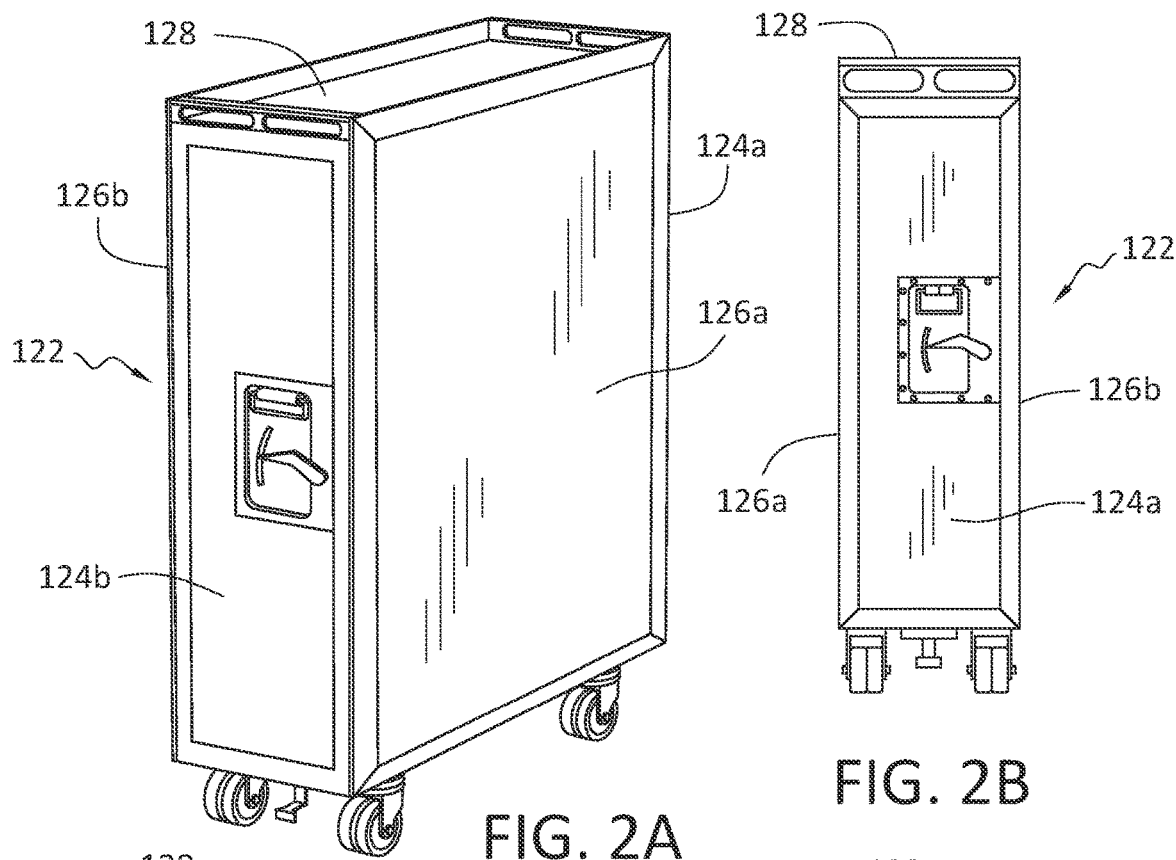
FIG. 2A
FIG. 2B
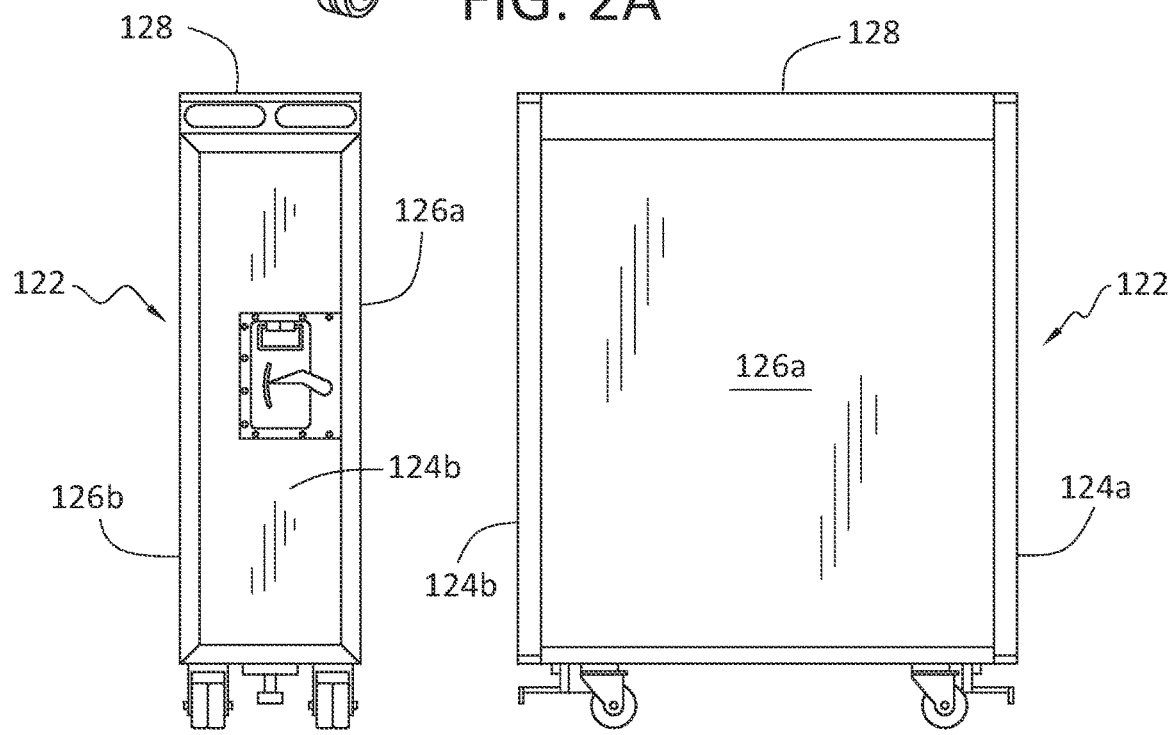
FIG. 2C
FIG. 2D

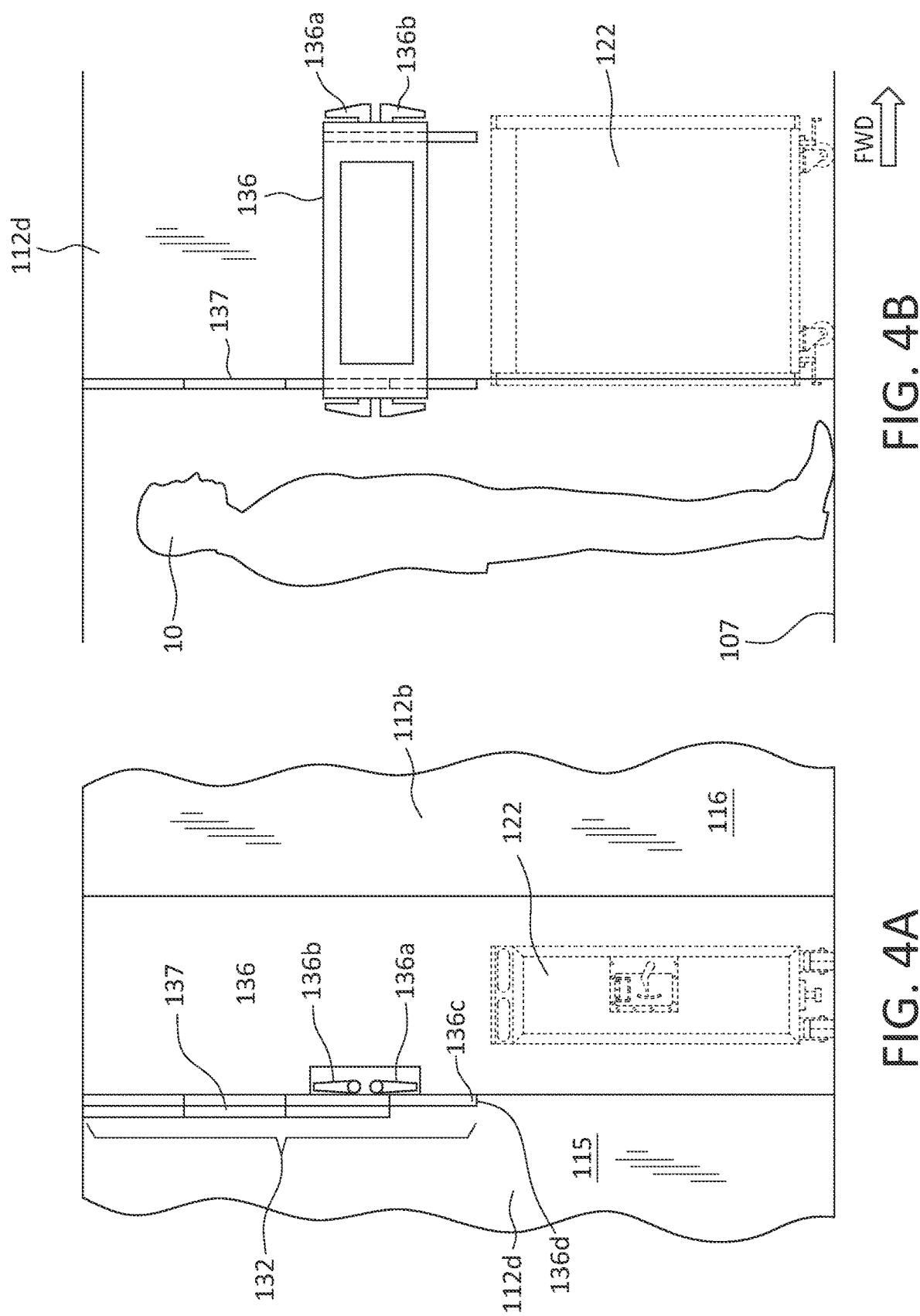

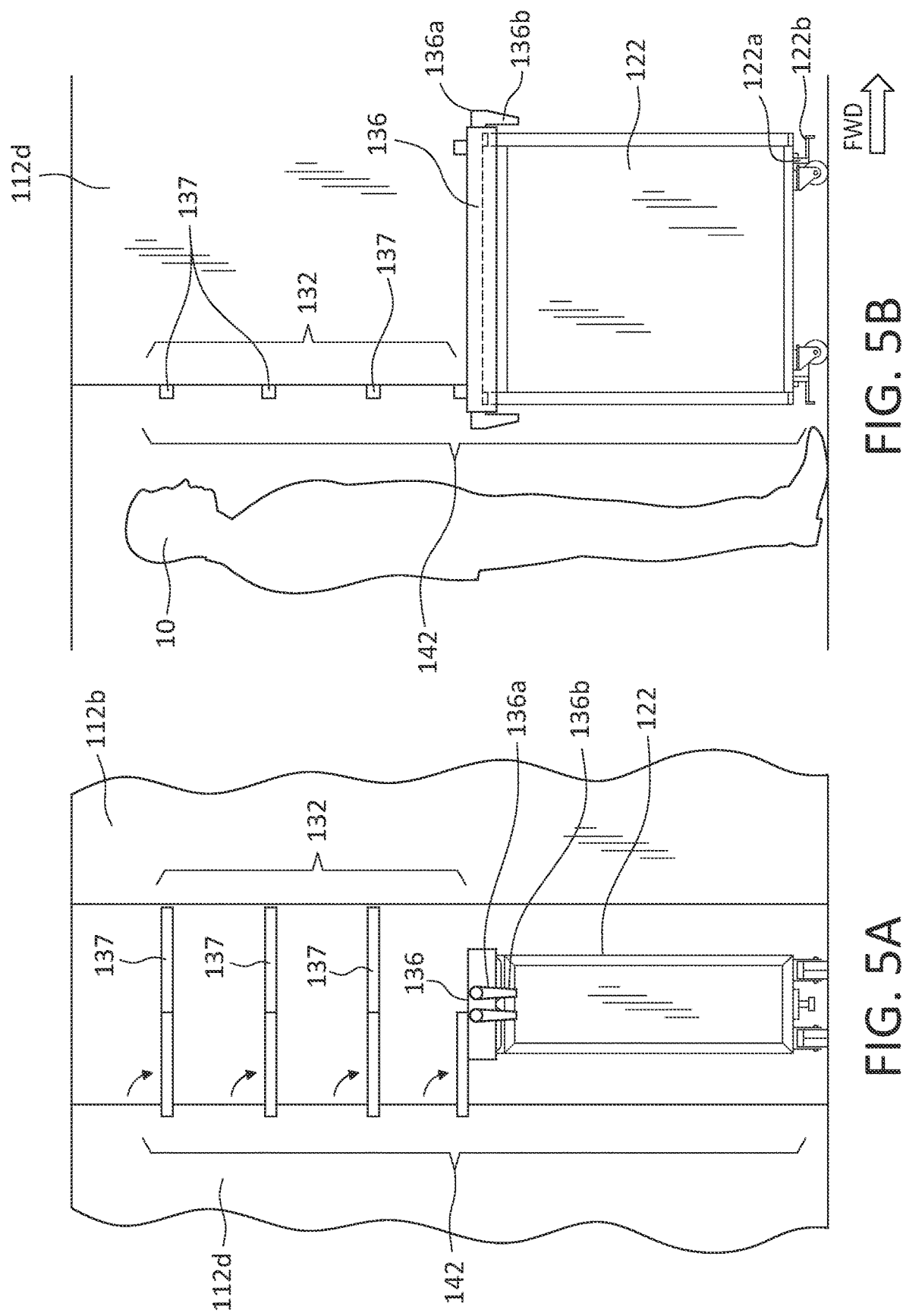

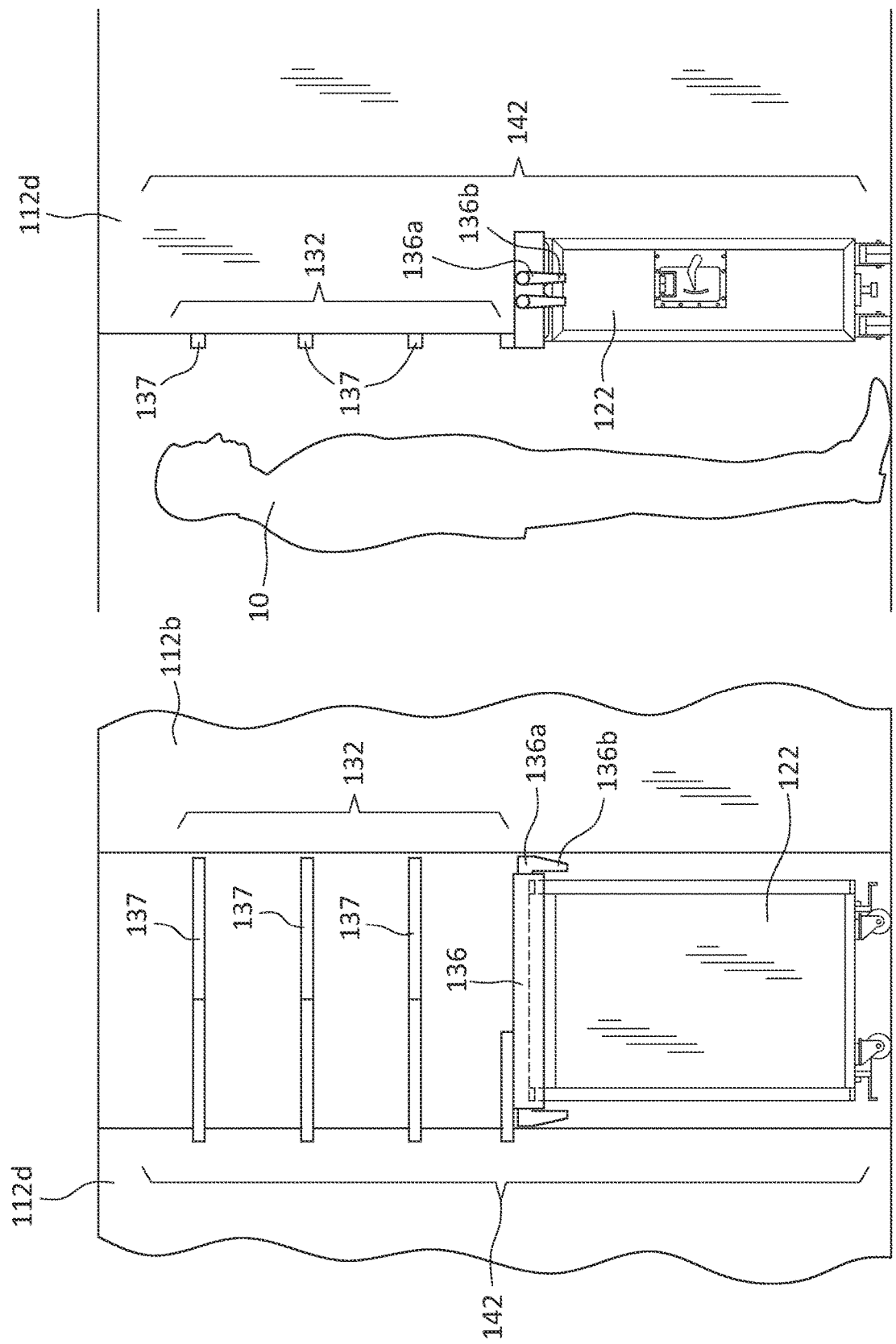

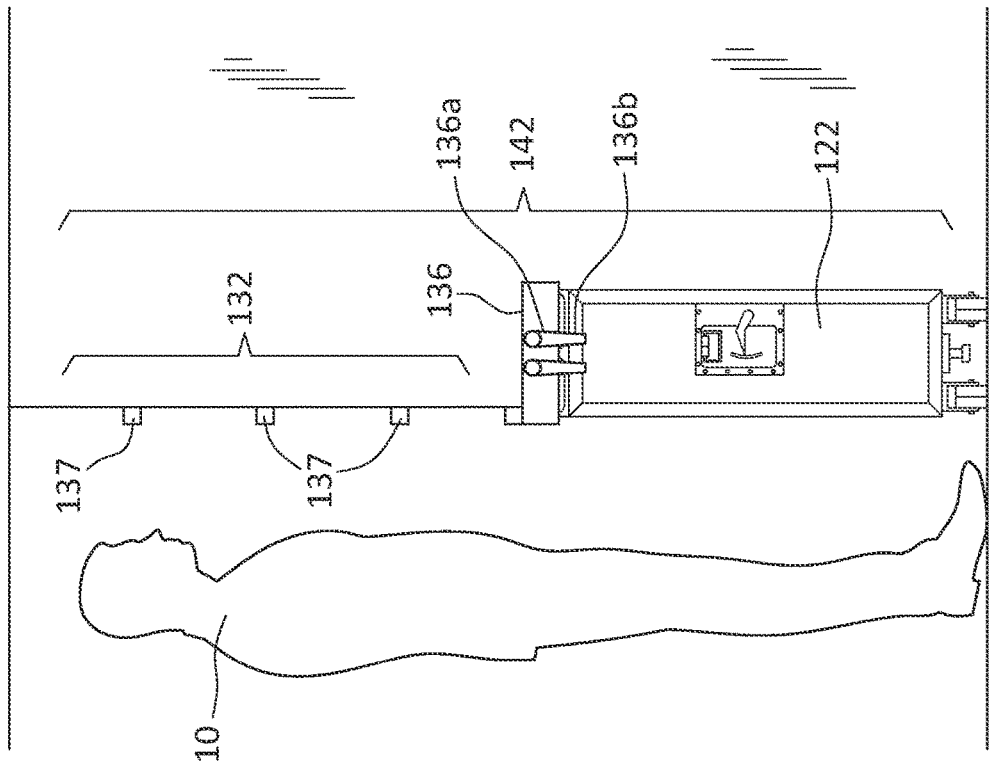
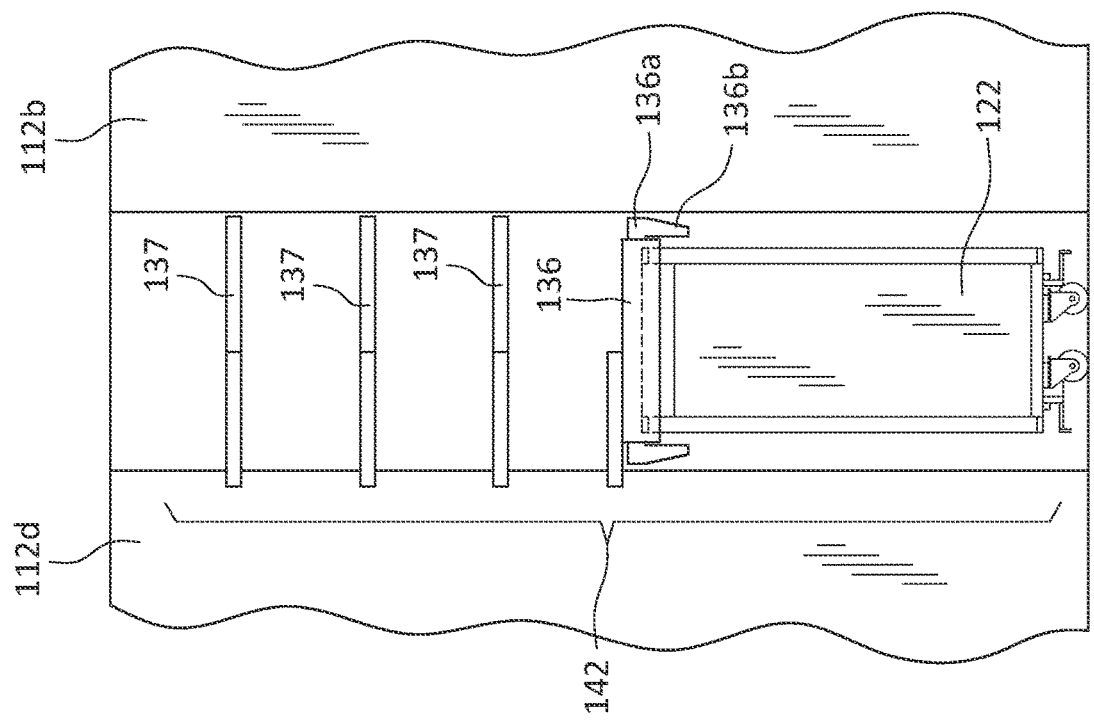
FIG. 7A
FIG. 7B

HYBRID BARRIER FOR AIRCRAFT CABIN

TECHNOLOGICAL FIELD

The present disclosure relates generally to the field of barriers and, more specifically, to barrier doors configured to be used within an aircraft.

BACKGROUND

Aircraft have a flight deck that includes flight instruments, instrument panels, and various controls that enable the flight personnel to operate the aircraft. The flight deck is positioned towards the front of the aircraft and is usually a separate compartment away from the cabin area where passengers sit during flight. A flight deck door further separates the flight deck from the cabin area.

The flight deck door is closed and locked during flight. This allows the flight personnel to concentrate on operating the aircraft and also prevents entry of unwanted persons into the flight deck. However, the flight deck door may be opened during flight for various reasons. One occurrence is when the flight personnel use the lavatory which is located in the cabin area of the aircraft. Another occurrence is when food and/or drinks that are prepared in the galley of the cabin area are delivered to the flight personnel on the flight deck.

Opening of the flight deck door could present an opportunity for an unwanted person to gain entry to the flight deck. The unwanted person could suddenly rush the front of the aircraft once the flight deck door is opened and force their way into the flight deck. It would be difficult for flight personnel working in the cabin area to react to this movement in a fast enough manner to close and lock the flight deck door.

A device is needed that would inhibit a person from rushing towards the flight deck. The device would prevent the person from reaching the front of the aircraft or would slow their movement such that the flight deck door could be closed and locked prior to the person reaching the flight deck.

Unless explicitly identified as such, no statement herein is admitted as prior art merely by its inclusion in the Technological Field and/or Background section.

SUMMARY

Present aspects are directed to a deployable barrier in a vehicle cabin area that can be, for example, an aircraft cabin vestibule area, with the barrier formed by deploying a hybrid barrier into a deployed position from a stowed position, with the barrier in the deployed position configured to impede passage of a person from a cabin area aft of the deployed hybrid barrier to a position forward of the deployed hybrid barrier, including from a cabin area and vestibule area into a vehicle control deck area positioned forward of the deployed hybrid barrier, with the vehicle control deck area being, for example, a flight deck in an aircraft.

A present aspect is directed to an aircraft cabin barrier including an aircraft cabin galley cart in fixed combination with a aircraft cabin barrier second (upper) component, with the aircraft cabin barrier second component movably attached at one end to an aircraft cabin monument, with the aircraft cabin monument positioned adjacent to an aisle, with the aircraft cabin barrier second component movable between a stowed state and a deployed state, and with the aircraft cabin barrier second component comprising an aircraft cabin barrier second component first side and an aircraft cabin barrier second component second side. The aircraft cabin barrier, that can be a secondary barrier, further includes a frame, with the frame comprising a frame end, with the frame end movably attached to the aircraft cabin monument, with the frame movable between a stowed state and a deployed state, with the frame in the deployed state configured to engage with the aircraft cabin galley cart to form the aircraft cabin barrier.

In a further aspect, the frame in the deployed state is further configured to engage the aircraft cabin barrier second (upper) component to form the aircraft cabin barrier.

In another aspect, the aircraft cabin barrier second component further comprises an aircraft cabin barrier second component through-opening extending through a thickness of the aircraft cabin barrier second component from the aircraft cabin second component first side to the aircraft cabin barrier second component second side.

In another aspect, the aircraft cabin monument is at least one of a galley wall, a lavatory wall, a partition wall, and a closet wall.

In a further aspect, the frame is integral with the aircraft cabin barrier second component.

In another aspect, the frame is configured to engage the aircraft cabin galley cart, with the frame further configured to engage with the aircraft cabin barrier second component to form the aircraft cabin barrier, said aircraft cabin barrier in the deployed state configured to control passage of a person along the aircraft cabin aisle.

In another aspect, the aircraft cabin barrier second component in the stowed state is configured to rest substantially within an aircraft cabin monument footprint.

In another aspect, the aircraft cabin barrier second component in the deployed state is configured to rest outside of the aircraft cabin monument footprint.

In a further aspect, the aircraft cabin barrier second component includes an aircraft cabin barrier second component vertical first end and further comprises an aircraft cabin barrier second component vertical second end, with the aircraft cabin barrier vertical first end hingedly attached to the aircraft cabin monument, with the aircraft cabin barrier second component configured to pivot radially about the first end to move between the stowed state and the deployed state.

In another aspect, the aircraft cabin barrier second component comprises a plurality of movable extending members movably attached to the aircraft cabin monument, said movable extending members configured to move outwardly from a stowed position immediately adjacent an aircraft cabin monument wall and substantially within the aircraft cabin monument footprint to a deployed position extending beyond the aircraft cabin monument footprint and extending a distance into an adjacently positioned aircraft cabin aisle.

In another aspect, the frame is extendible to a plurality of movable frame lengths (to engage with and to accommodate and/or receive a half-size galley cart and/or a full-size galley cart.

In a further aspect, the frame in the deployed state is configured to maintain the galley cart in a substantially fixed location.

In another aspect, at least one of said aircraft cabin barrier second component first side and said aircraft cabin barrier second component second side includes a locking mechanism to engage with the frame.

In another aspect, the locking mechanism comprises a one-quarter turn latch.

A further present aspect is directed to an aircraft including an aircraft cabin barrier, with the aircraft barrier including an aircraft cabin galley cart in fixed combination with an aircraft cabin barrier second (upper) component, with the aircraft cabin barrier second component movably attached at one end to an aircraft cabin monument, with the aircraft cabin monument positioned adjacent to an aisle, with the aircraft cabin barrier second component movable between a stowed state and a deployed state, and with the aircraft cabin barrier second component comprising an aircraft cabin barrier second component first side and an aircraft cabin barrier second component second side. The aircraft cabin barrier, that can be a secondary barrier, further includes a frame, with the frame comprising a frame end, with the frame end movably attached to the aircraft cabin monument, with the frame movable between a stowed state and a deployed state, with the frame in the deployed state configured to engage with the aircraft cabin galley cart to form the aircraft cabin barrier.

In another aspect, the frame in the deployed state is further configured to engage the aircraft cabin barrier second (upper) component to form the aircraft cabin barrier.

Another present aspect is directed to an aircraft cabin monument including an aircraft cabin monument wall, with the aircraft cabin monument wall including a deployable aircraft cabin barrier (upper) component that can be a movable aircraft cabin barrier component, with the movable aircraft cabin barrier component movably attached at a movable aircraft cabin barrier component end to the aircraft cabin monument wall, with the movable aircraft cabin monument wall positioned adjacent to an aircraft cabin aisle, with the movable aircraft cabin barrier component including a movable aircraft cabin barrier component stowed state and a movable aircraft cabin barrier component deployed state, with the movable aircraft cabin barrier component including a movable aircraft cabin barrier component first side and movable aircraft cabin barrier component second side. The aircraft cabin monument further includes a deployable frame that can be a movable frame, with the movable frame movably attached at a movable frame end to an aircraft cabin monument wall, with the movable frame configured to move between a movable frame stowed state and a movable frame deployed state, with the movable frame in the movable frame deployed state further configured to engage with a galley cart, and with the movable frame in the movable frame deployed state further configured to engage with movable aircraft cabin barrier (upper) component to form an aircraft cabin barrier.

In another aspect, the movable aircraft barrier component further comprises a movable aircraft cabin barrier component through-opening extending through a door thickness of the movable aircraft cabin barrier component from the movable aircraft cabin barrier component first side to the movable aircraft cabin barrier component second side.

In another aspect, the movable aircraft cabin barrier component comprises an aircraft cabin barrier component vertical first end and further comprises an aircraft cabin barrier component vertical second end, with the movable aircraft cabin barrier component vertical first end hingedly attached to the aircraft cabin monument, said movable aircraft cabin barrier component configured to pivot radially about the movable aircraft cabin barrier component vertical first end to move between the movable frame stowed state and the movable frame deployed state.

In another aspect, the aircraft cabin barrier second component comprises a plurality of movable extending members movably attached to the aircraft cabin monument, said movable extending members configured to move outwardly from a stowed position immediately adjacent an aircraft cabin monument wall and substantially within the aircraft cabin monument footprint to a deployed position extending beyond the aircraft cabin monument footprint and extending a distance into an adjacently positioned aircraft cabin aisle.

In another aspect, the movable aircraft cabin barrier component is integral with the movable frame.

In another aspect, the movable frame comprises a locking mechanism to engage with the galley cart, said locking mechanism comprising a one-quarter turn latch.

Another present aspect is directed to an aircraft comprising the aircraft cabin monument, with the aircraft cabin monument including an aircraft cabin monument wall, with the aircraft cabin monument wall including a deployable aircraft cabin barrier component (upper barrier) that can be a movable aircraft cabin barrier component, with the movable aircraft cabin barrier component movably attached at a movable aircraft cabin barrier component end to the aircraft cabin monument wall, with the movable aircraft cabin monument wall positioned adjacent to an aircraft cabin aisle, with the movable aircraft cabin barrier component including a movable aircraft cabin barrier component stowed state and a movable aircraft cabin barrier component deployed state, with the movable aircraft cabin barrier component including a movable aircraft cabin barrier component first side and movable aircraft cabin barrier component second side. The aircraft cabin monument further includes a deployable frame that can be a movable frame, with the movable frame movably attached at a movable frame end to an aircraft cabin monument wall, with the movable frame configured to move between a movable frame stowed state and a movable frame deployed state, with the movable frame in the movable frame deployed state further configured to engage with a galley cart, and with the movable frame in the movable frame deployed state further configured to engage with movable aircraft cabin barrier (upper) component to form an aircraft cabin barrier.

A further present aspect is directed to a method of controlling movement of passengers along an aisle within an aircraft cabin area, with the method including prior to opening a flight deck door, moving a barrier to a closed position with a flight deck being on a first side of the barrier and a passenger section of the cabin area being on a second side of the barrier, the barrier comprising a lock, with the barrier including a movable aircraft cabin galley cart. The barrier further includes a deployable aircraft cabin barrier second component that can be a movable aircraft cabin barrier second (upper) component, with the movable aircraft cabin barrier second component movably attached at one end to an aircraft cabin monument wall, with the aircraft cabin monument positioned adjacent to an aisle wall, with the movable aircraft cabin barrier second component comprising a stowed state and a deployed state, and with the movable aircraft cabin barrier second component further comprising a first side and a second side. The barrier further includes a deployable frame that can be a movable frame, with the movable frame movably attached at one end to the aircraft cabin monument wall, with the movable frame movable between a stowed state and a deployed state, with the movable frame in the deployed state configured to engage with the movable aircraft cabin galley cart, and with the movable frame in the deployed state further configured to engage the movable aircraft cabin barrier second (upper) component to form the aircraft cabin barrier. The method further includes locking the barrier in the closed position, after locking the barrier, opening the flight deck door and providing access to flight personnel to a front section of the cabin area, with the front section of the cabin area located at the first side of the barrier, and after providing access to the front section of the cabin area to the flight personnel, reclosing the flight deck door.

In another aspect, the method further includes monitoring a position of the barrier, and activating an indicator in the flight deck when the barrier is in the closed position.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1A:
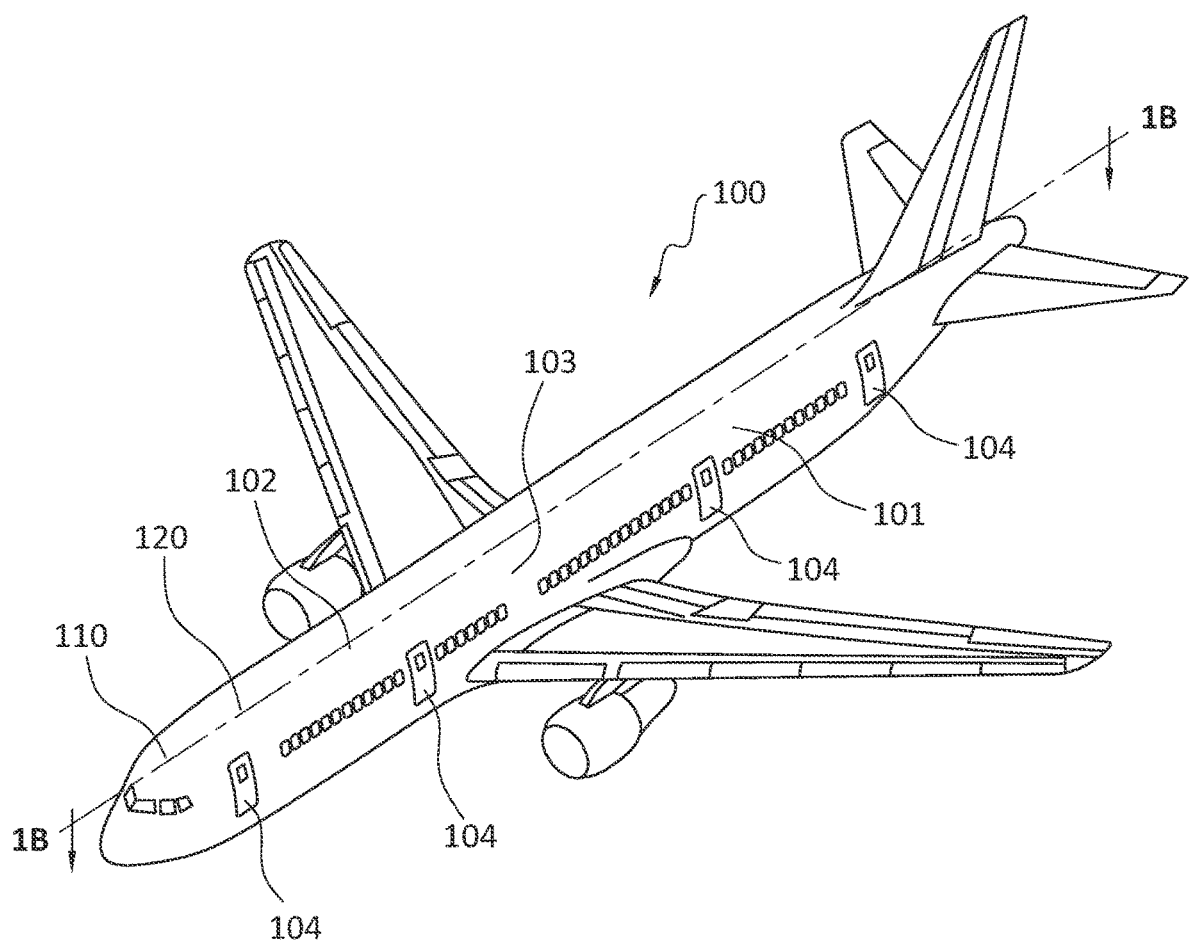
Figure 1B:
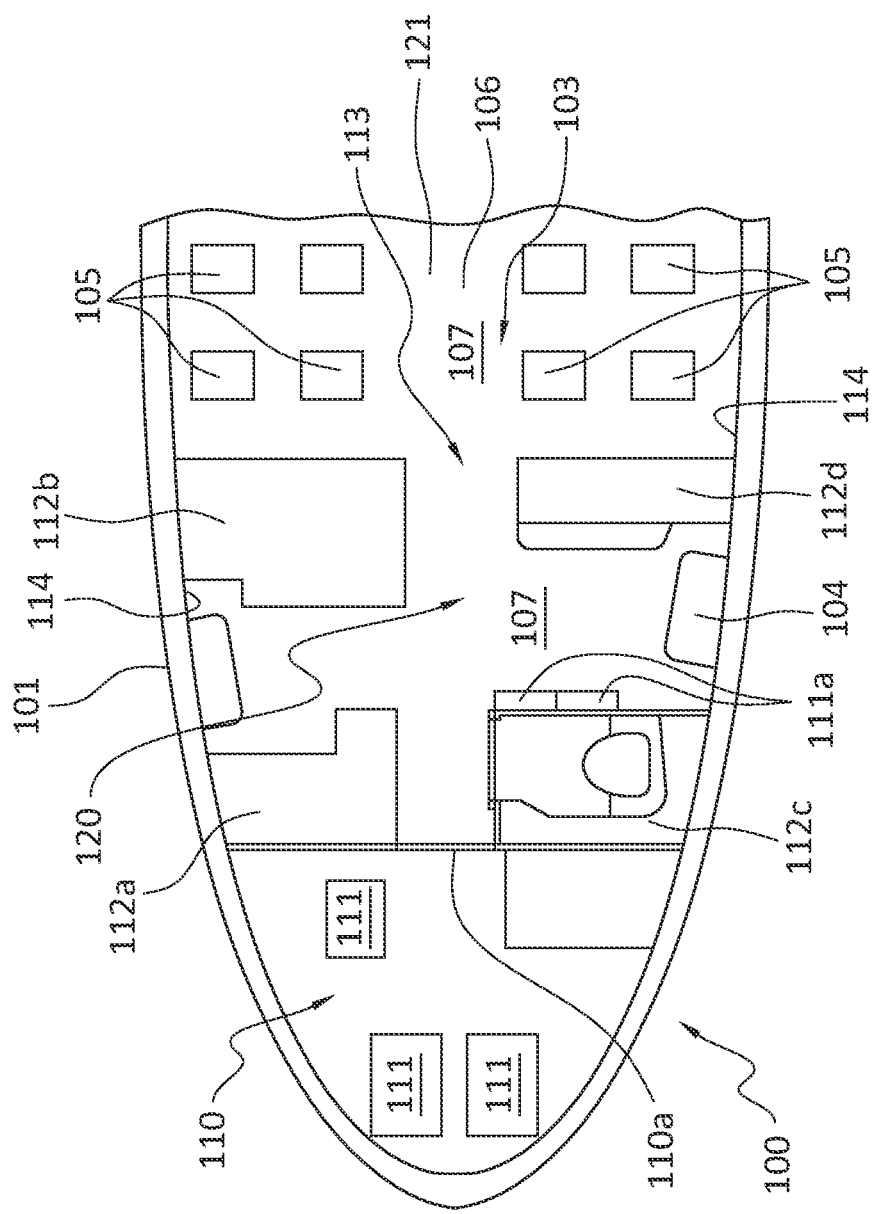
Figure 3A:
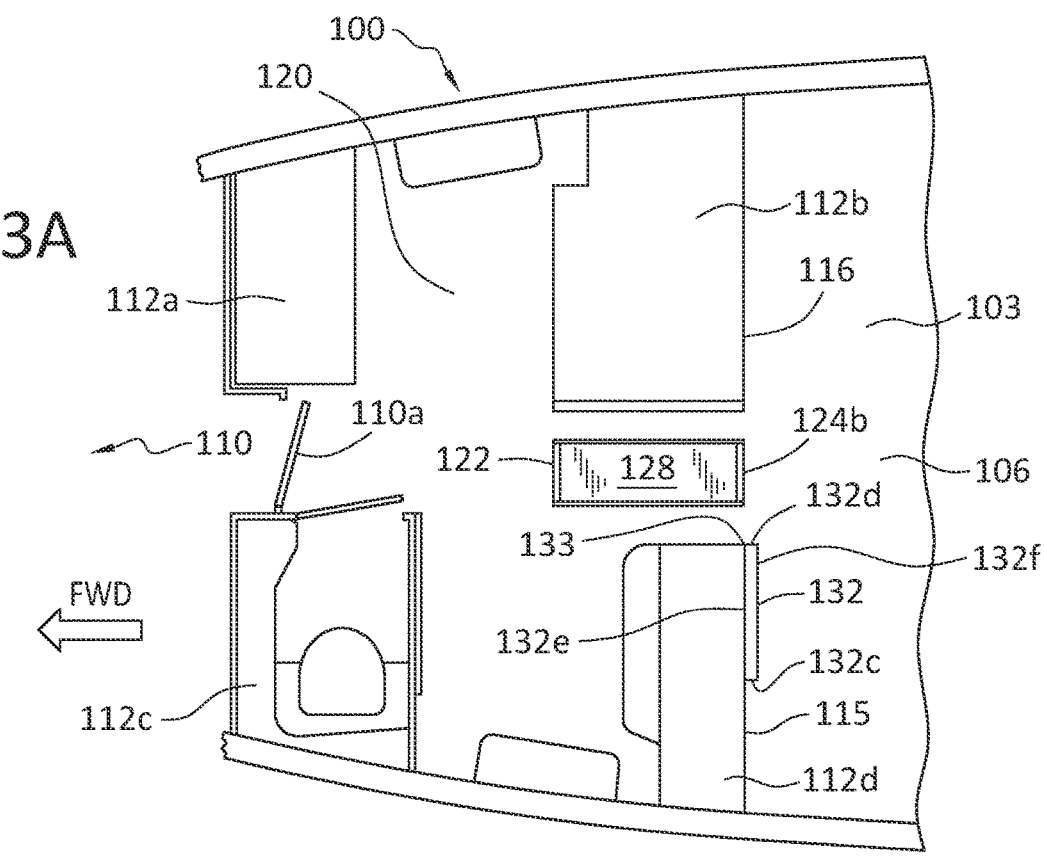
Figure 3B:
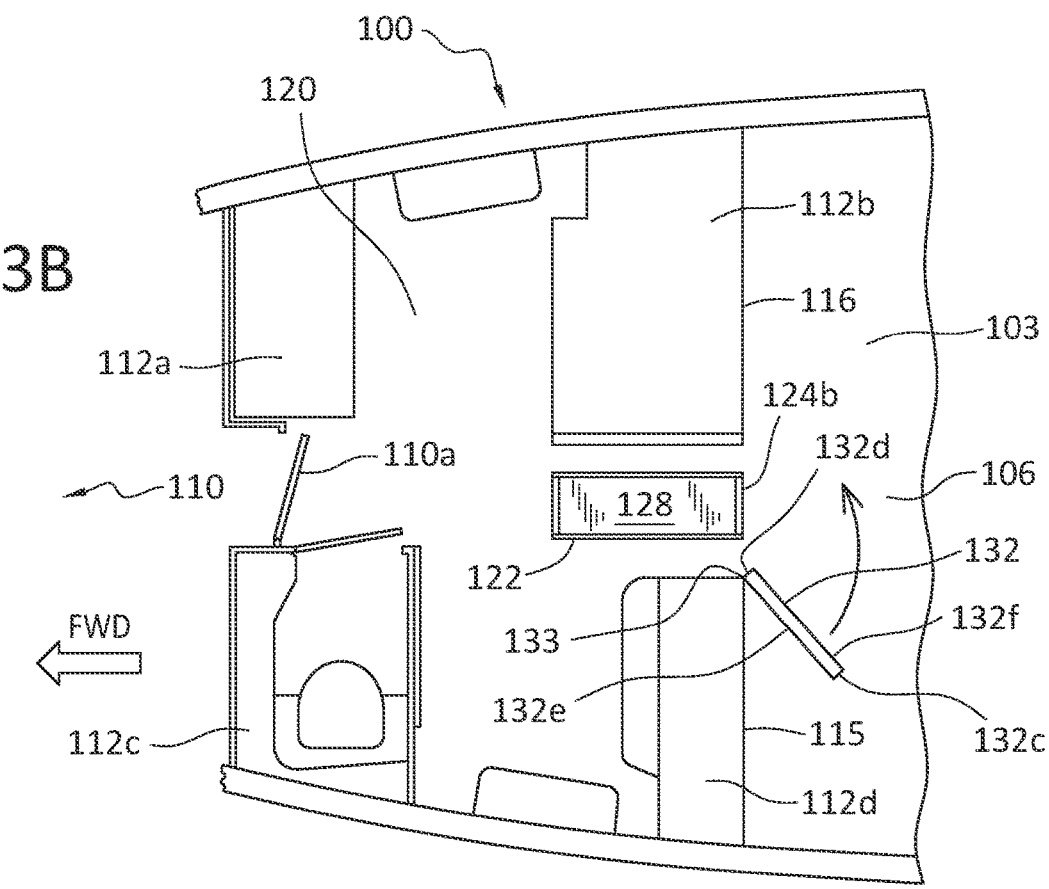
Figure 3C:
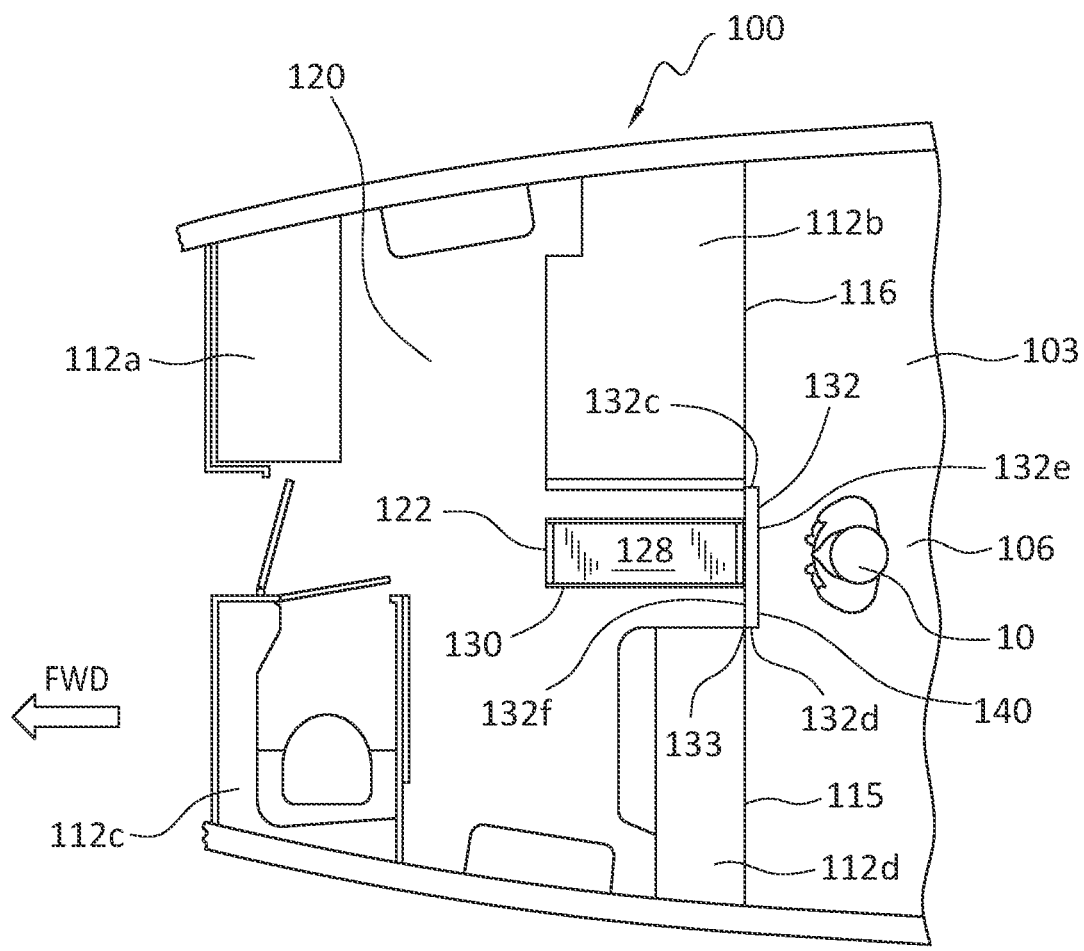
Figure 3D:
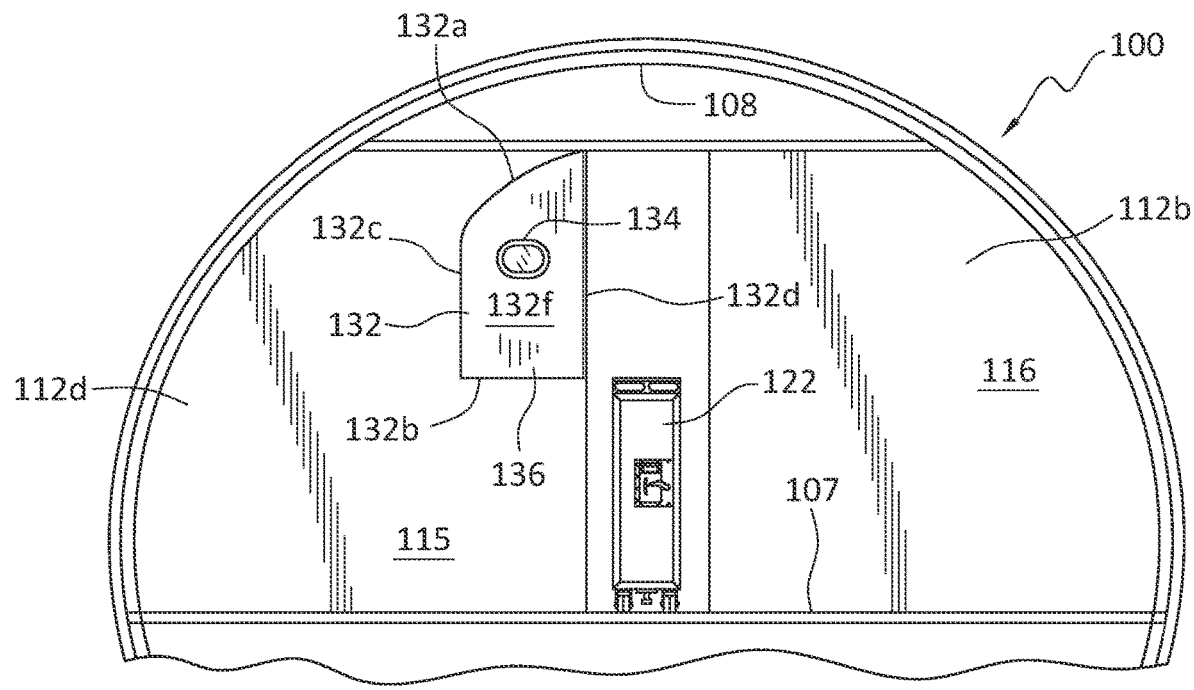
Figure 3E:
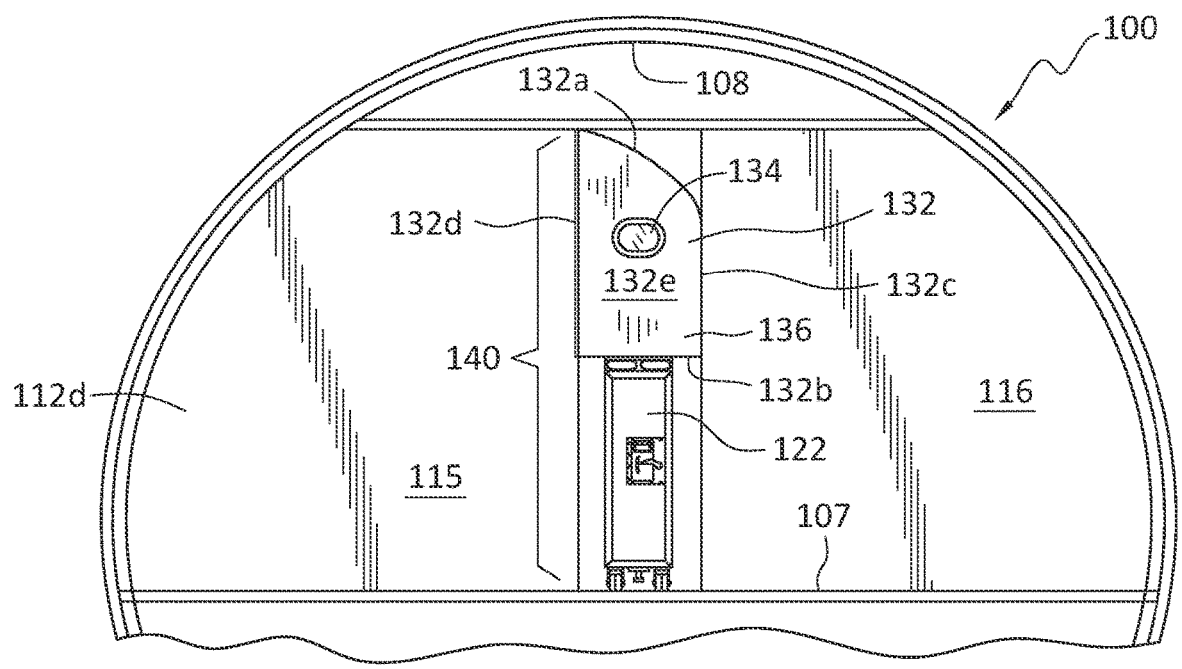
Figure 5C:
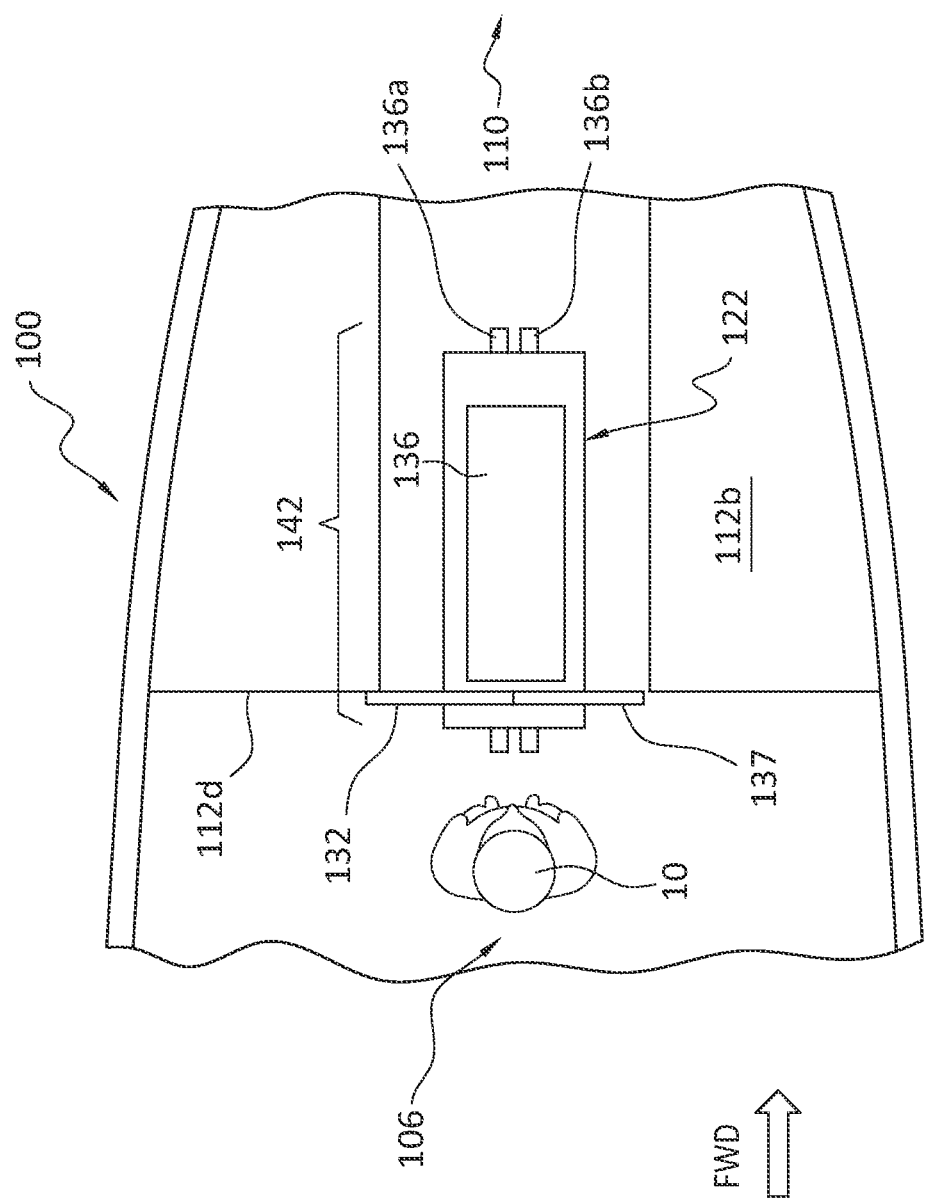
Figure 8:
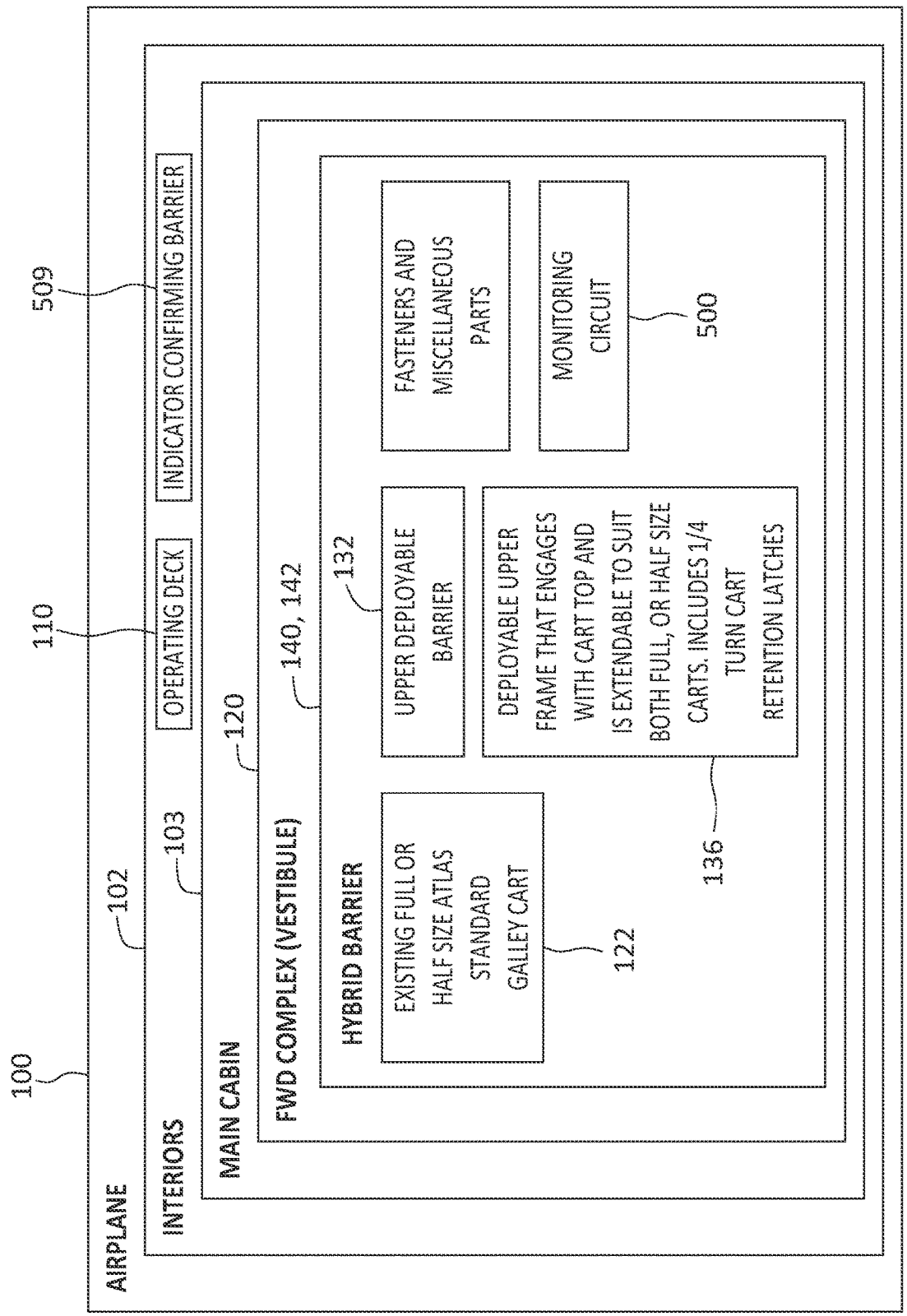
Figure 9:
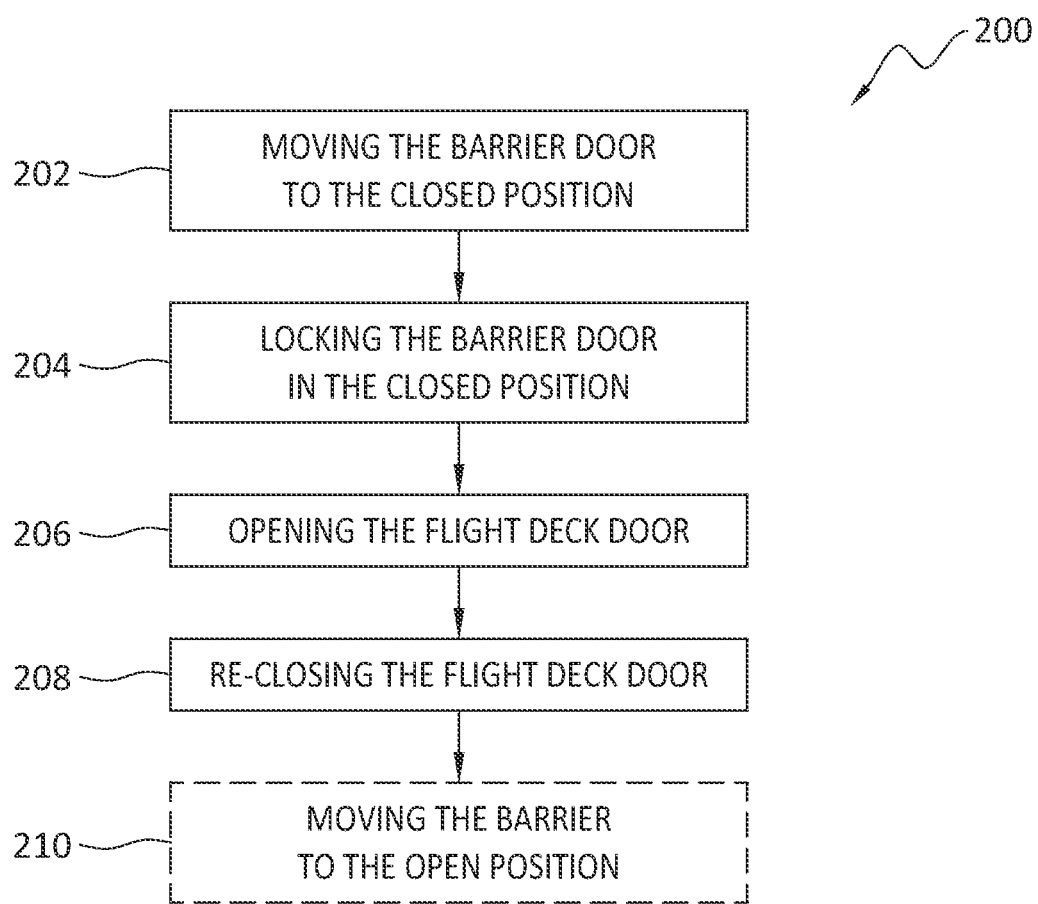
Figure 10:
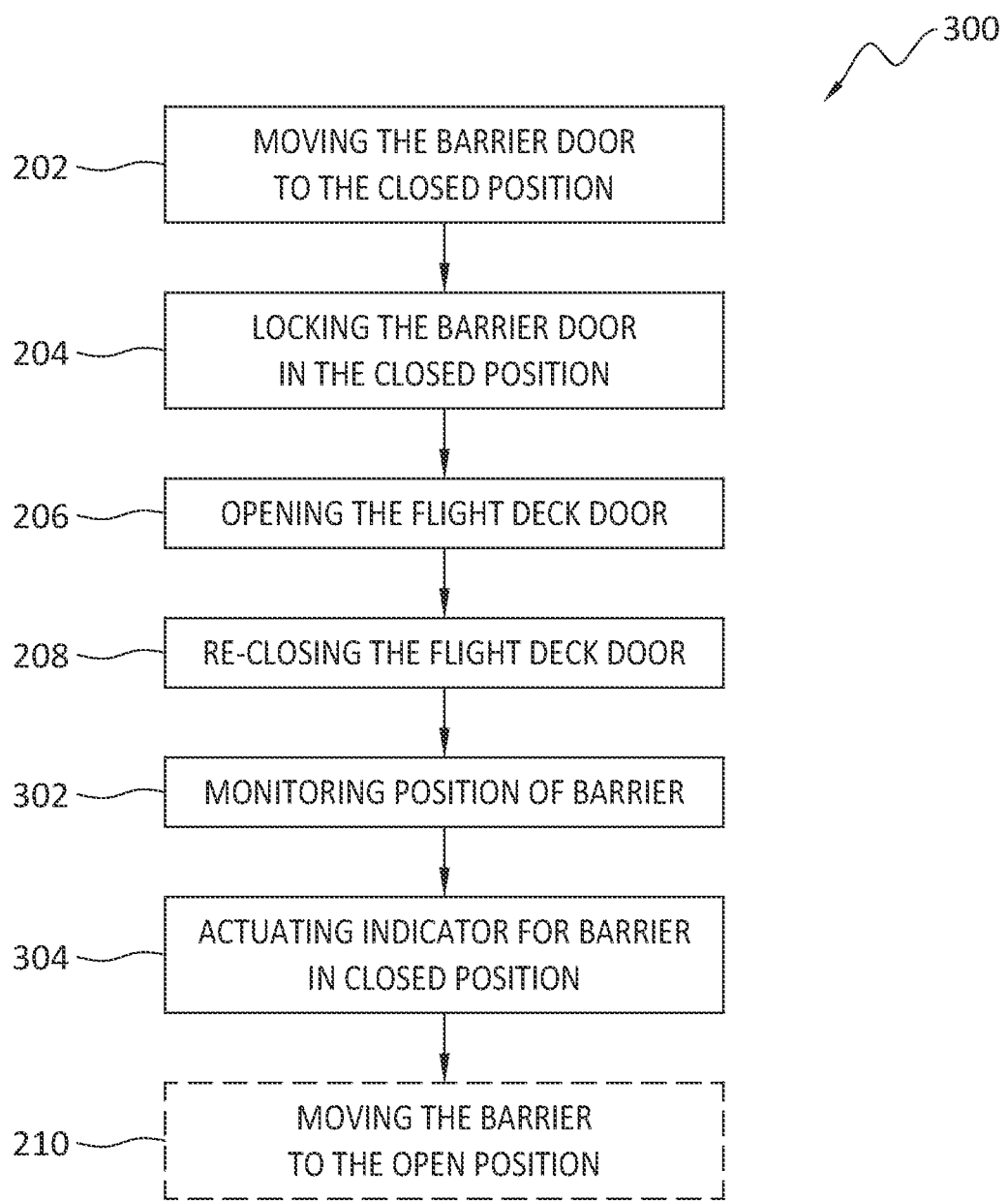
Figure 11:
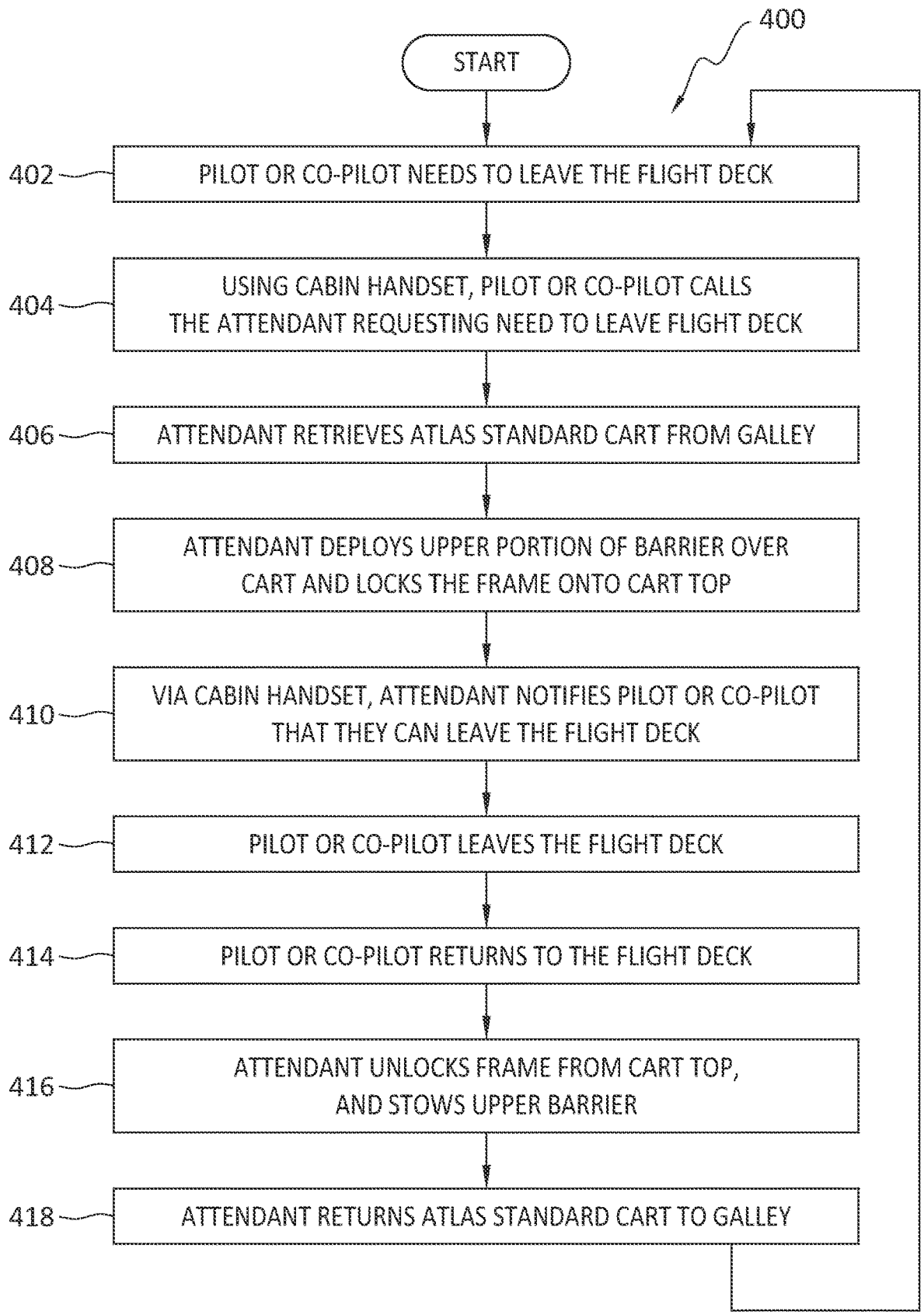
Figure 12:
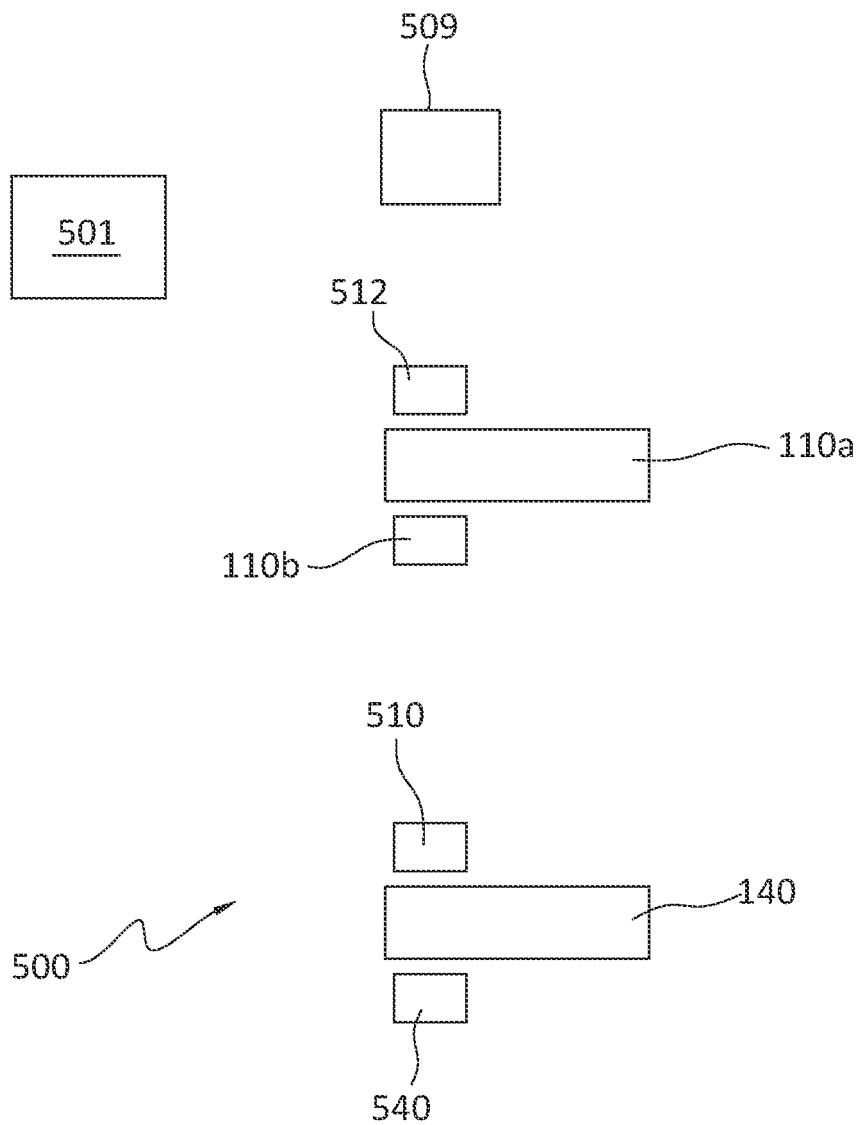
Figure 13:
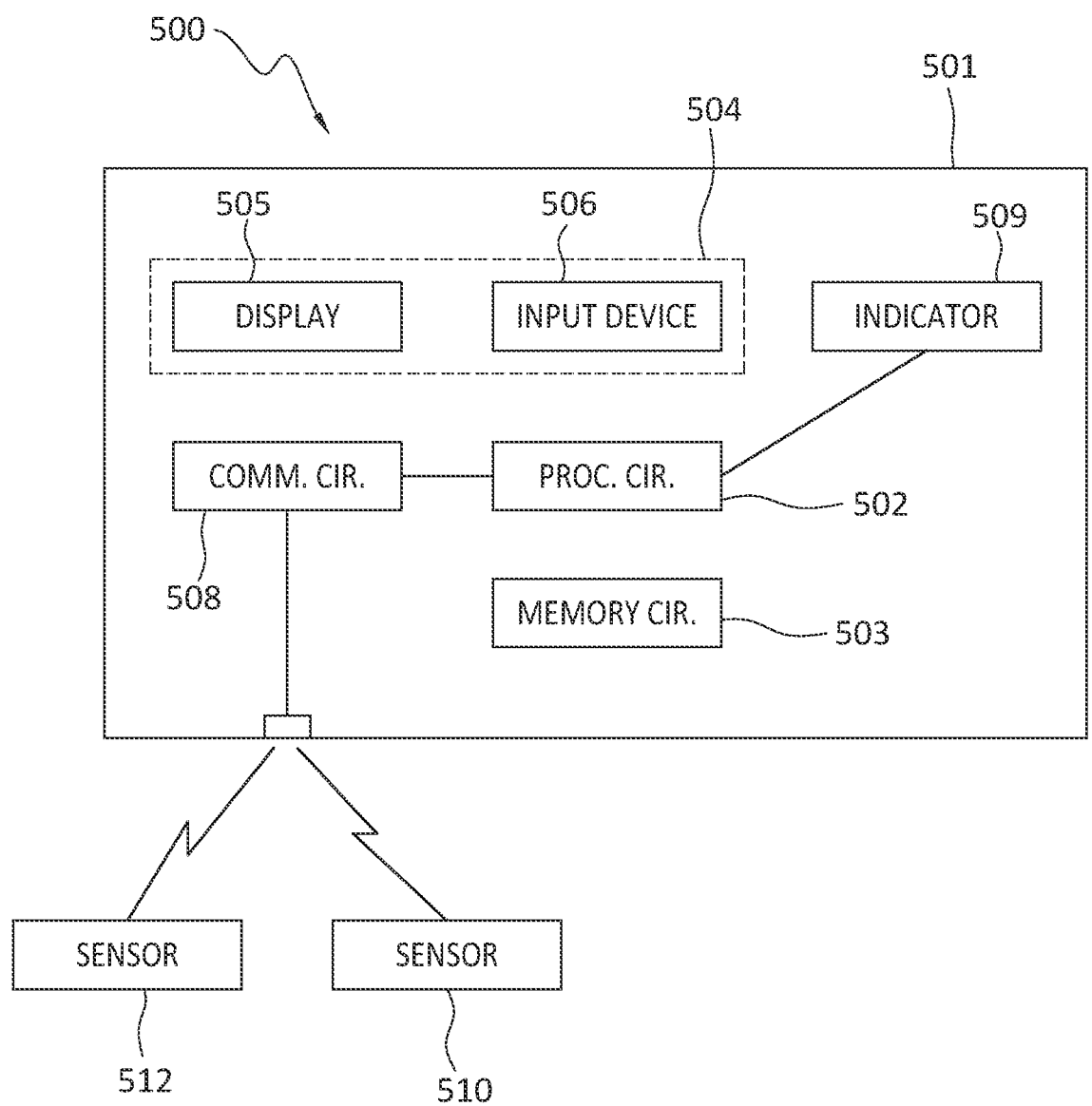

Having thus described variations of the disclosure in general terms, reference will now be made to the accompanying drawings, which are not necessarily drawn to scale, and wherein:

FIG. 1A is an illustration of a vehicle in the form of an aircraft, according to present aspects;

FIG. 1B is an overhead cross-sectional partial view of a forward section of an aircraft cabin of the type found within the exemplary aircraft shown in FIG. 1A and taken along line 1B-1B, according to present aspects;

FIG. 2A is a perspective view of a galley cart that is configured to be deployed as an aircraft cabin barrier component of a temporary aircraft cabin barrier that is established, and that can be a secondary barrier, according to present aspects;

FIG. 2B is a first end (rear) view galley cart first end view, of the type shown in FIG. 2A, that is configured to be deployed as an aircraft cabin barrier component of a temporary aircraft cabin barrier that is established, and that can be a secondary barrier, according to present aspects;

FIG. 2C is a second end (front) view galley cart first end view, of the type shown in FIG. 2A, that is configured to be deployed as an aircraft cabin barrier component of a temporary aircraft cabin barrier that is established, and that can be a secondary barrier, according to present aspects;

FIG. 2D is a side view of a galley cart that is configured to be deployed as an aircraft cabin barrier component or a temporary aircraft cabin barrier that is established, and that can be a secondary barrier, according to present aspects;

FIG. 3A is an overhead cross-sectional partial view of an aircraft cabin of the type found within the exemplary aircraft shown in FIG. 1A taken along line 1B-1B, according to present aspects;

FIG. 3B is an overhead cross-sectional partial view of an aircraft cabin of the type found within the exemplary aircraft shown in FIG. 3A, according to present aspects;

FIG. 3C is an overhead cross-sectional partial view of an aircraft cabin of the type found within the exemplary aircraft shown in FIGS. 3A, 3B, according to present aspects;

FIG. 3D is a forward view from within an aircraft cabin of an aircraft of the type shown at least in FIG. 1A, and corresponding to the position of the galley cart as shown in FIG. 3A, according to present aspects;

FIG. 3E is a forward view from within an aircraft cabin of an aircraft of the type shown at least in FIGS. 1A, and corresponding to the position of the galley cart as shown in FIG. 3C, according to present aspects;

FIG. 4A is a forward view from within an aircraft cabin of an aircraft of the type shown at least in FIG. 1A, and showing an aircraft cabin barrier second component in its stowed configuration against a cabin monument wall, according to present aspects;

FIG. 4B is an outboard view from within an aircraft cabin of an aircraft of the type shown at least in FIG. 1A showing a side view of a galley cart in a deployed position as a temporary barrier and an aircraft cabin barrier second component in a stowed position, according to present aspects;

FIG. 5A is a forward view from within an aircraft cabin of an aircraft of the type shown at least in FIG. 1A, and showing an aircraft cabin barrier second component in a deployed barrier configuration engaged with a galley cart to form a deployed barrier, according to present aspects;

FIG. 5B is an outboard view from within an aircraft cabin of an aircraft of the type shown at least in FIG. 1A, and showing a side view of an aircraft cabin barrier second component in a deployed barrier configuration engaged with a galley cart to form a deployed barrier, according to present aspects;

FIG. 5C is an overhead view from within an aircraft cabin of an aircraft of the type shown at least in FIG. 1A, and showing an overhead view of an aircraft cabin barrier second component in a deployed barrier configuration engaged with a galley cart to form a deployed barrier, according to present aspects;

FIG. 6A is a forward view from within an aircraft cabin of an aircraft of the type shown at least in FIG. 1A, and showing an aircraft cabin barrier second component in a deployed barrier configuration engaged with a galley cart in an alternate galley cart position to form a deployed barrier, according to present aspects;

FIG. 6B is an outboard view from within an aircraft cabin of an aircraft of the type shown at least in FIG. 1A, and showing a side view of an aircraft cabin barrier second component in a deployed barrier configuration engaged with a galley cart in an alternate galley cart position to form a deployed barrier, according to present aspects;

FIG. 7A is a forward view from within an aircraft cabin of an aircraft of the type shown at least in FIG. 1A, and showing an aircraft cabin barrier second component in a deployed barrier configuration engaged with an alternate galley cart type to form a deployed barrier, according to present aspects;

FIG. 7B is an outboard view from within an aircraft cabin of an aircraft of the type shown at least in FIG. 1A, and showing a side view of an aircraft cabin barrier second component in a deployed barrier configuration engaged with an alternate galley cart type to form a deployed barrier, according to present aspects;

FIG. 8 is a block diagram illustrating an aircraft and an aircraft cabin with a hybrid barrier, according to present aspects;

FIG. 9 is a flowchart outlining a method, according to present aspects;

FIG. 10 is a flowchart outlining a method, according to present aspects;

FIG. 11 is a flowchart outlining a method, according to present aspects;

FIG. 12 is a schematic drawing of a monitoring system according to present aspects; and FIG. 13 is a schematic box drawing of a monitoring system, according to present aspects.

DETAILED DESCRIPTION

According to present aspects, an aircraft cabin barrier can be deployed, including temporarily deployed, for example as a secondary barrier in an aircraft cabin, to control and restrict the passage of persons onto a flight deck from a passenger cabin section or from within a vestibule area. The barrier can be a hybrid barrier that is formed through the deployment of a hybrid barrier components comprising a galley cart that is repositioned from a stowed position to a deployed position within an aircraft cabin aisle and that is repurposed from a galley cart into an aircraft cabin barrier first, or "lower", component. The galley cart that is repurposed into the aircraft cabin barrier first, or "lower", component is configured to engage with an aircraft cabin barrier second, or "upper" component and/or to a frame that is moved from a stowed to a deployed position over and proximate to the galley cart to engage with one or more of the galley cart and an aircraft cabin barrier second, or "upper", component. The engagement of the barrier first component (e.g., the galley cart) to the frame and/or to the barrier second component to form the barrier is configured to occur when a barrier, that can be a secondary barrier, is desired or required within, for example, an aircraft cabin.

Present aspects afford significant advantages regarding the formation and use of the hybrid barrier as an additional or secondary barrier restricting access to positions forward of the deployed hybrid barrier including, for example, a flight deck. Such present advantages include, without limitation, the use of existing aircraft cabin structures (e.g., a galley cart) as a component in the structural formation of the hybrid, secondary barrier, such that very little additional weight is added to the aircraft to include the secondary barrier. In addition, retrofitting processes configured to include/add the presently disclosed hybrid barriers into an aircraft cabin and into aircraft cabins of aircraft are significantly simplified as minimal hardware is required to construct and otherwise establish the present barriers, without adding significant weight or cost.

According to present aspects, FIGS. 1A and 1B illustrate a vehicle in the form of an aircraft 100 that includes a fuselage 101. FIG. 1B is a partial cross-sectional view of aircraft 100 taken across line 1B-1B. As shown in FIGS. 1A and 1B, a flight deck 110 and flight deck door 110a are positioned at a front, or forward section, of the fuselage 101 and a cabin area 103 is positioned rearward (referred to equivalently herein as "aft"). The cabin area 103 is equipped for accommodating passengers. The size of the flight deck 110 and the cabin area 103 can vary depending upon the aircraft 100. One or more doors 104 provide for passengers to enter and exit the aircraft 100.

The flight deck 110 includes one or more crew seats 111 for the flight personnel including the pilot, co-pilot, and navigator, and attendant/crew seats 111a. Various controls and instrument panels (not illustrated) are located for use by the pilot and co-pilot to control the aircraft 100.

The cabin area 103 is positioned along the fuselage 101 aft of the flight deck 110. The cabin area 103 includes a passenger section 121 with passenger seats 105 arranged in rows along one or more aisles 106. In some examples, including, for example, a commercial airline, the passenger seats 105 extend throughout the cabin area 103. In other examples in which the aircraft 100 is used for cargo transport, a limited number of passenger seats 105 are positioned in the cabin area 103.

The cabin area 103 also includes a vestibule 120 positioned between the flight deck 110 and the passenger section 121. In some examples, the vestibule 120 includes crew seats 111a for use by flight personnel such as flight attendants. The crew seats 111a can fold to be out of the way when not being used. The vestibule 120 includes one or more monuments 112a, 112b, 112c, 112d that are mounted to the structural members of the aircraft 100 within the fuselage 101. The monuments are functional units used during flight with examples including but not limited to galleys (112a, 112b) that can, for example, incorporate one or more galley carts; lavatories (112c); and stowage units (112d), that can be, for example, closets, etc.

In some examples, the monuments 112a, 112b, 112c, 112d are shaped and sized to extend from the floor 107 to the ceiling 108 of the cabin area 103. In some examples, the monuments extend between a wall 114 of the fuselage 101 to an aisle 106. FIG. 1B further shows the vestibule 120 including a pair of galley monuments 112a, 112b, a lavatory monument 112c, and a stowage monument 112d that can be, for example, a closet.

A flight deck door 110a separates the flight deck 110 from the cabin area 103, and specifically separates the flight deck 110 from the vestibule 120. The flight deck door 110a prevents unintended persons from entering the flight deck 110 from the cabin area 103. FIG. 1B further illustrates an example with the opening 113 formed between a pair of monuments 112b, 112d. The opening 113 can be aligned with an aisle 106 to facilitate movement of passengers during boarding and exiting. The cabin area 103 further includes an opening 113 for passengers and flight personnel to pass through when moving between the vestibule 120 and the passenger section 121. The opening 113 can be formed between various components, such as monuments 112a, 112b, 112c, 112d, walls 114 of the fuselage 101, and passenger seats 105.

FIGS. 2A, 2B, 2C, and 2D are illustrations of a galley cart 122 of the type that can be stowed in a stowed position within a galley monument 112a, 112b that can be located within vestibule 120 of an aircraft cabin area 103 of aircraft 100, of the type shown, for example, in FIGS. 1A, 1B. As shown in FIGS. 2A, 2B, 2C, and 2D galley cart 122 comprises a galley cart first end 124a that can be alternately and equivalently referred to as a galley cart "rear" end; and a galley cart second end 124b that can be alternately and equivalently referred to as a galley cart "front" end as, for example, galley cart 122 is wheeled into and along an aisle of an aircraft cabin and aircraft vestibule area. Galley cart 122 further comprises galley cart first and second sides 126a, 126b, and a galley cart horizontal surface 128 that can be alternately and equivalently referred to as the galley cart "top" surface.

According to present aspects, FIGS. 3A, 3B, and 3C are overhead partial views of an aircraft cabin area of an aircraft 100 of the type shown at least in FIGS. 1A, 1B, with FIGS. 3A, 3B, 3C showing a progression as aircraft barrier components are deployed from a stowed state to a deployed state to form an assembled barrier 140 (shown at least in FIGS. 3C, 3E). As shown in FIG. 3A, when establishing a barrier (that can be a secondary barrier) is desired, galley cart 122 can be moved from a stowed position within a galley monument 112a, 112b to a deployed position within an area of aisle 106 that can be adjacent to and substantially bounded by aircraft cabin monuments 112b, 112d, and such that the galley cart second ("front") end 124b is positioned proximate to and substantially perpendicular to both galley monument wall 116 of galley monument 112b and monument wall 115 of monument 112d. As also shown in FIG. 3A, aircraft cabin barrier second component 132 is in a stowed configuration that is immediately adjacent to monument wall 115 of monument 112d such that aircraft cabin barrier second component 132 is substantially within a footprint of monument 112d.

As will be apparent, at least from FIGS. 3D and 3E, aircraft cabin barrier second component 132 has a barrier second component first (upper) end 132a, and a barrier second component second (lower) horizontal end 132b, such that the barrier second component second (lower) horizontal end 132b of the aircraft cabin barrier second component 132 can be positioned (in a deployed position) adjacent the galley monument wall 116 at a height that can be substantially equivalent to the height of the galley cart (top) horizontal surface 128 of galley cart 122. In addition, the width of the aircraft cabin second component 132 can be approximately equivalent to the width of aisle 106.

As shown in FIG. 3E, the barrier second component first (upper) end 132a is sloped or contoured such that when barrier second component first (upper) end 132a is in the deployed position, a gap is established and maintained between the barrier second component first (upper) end 132a and ceiling 108. The gap permits visual access through the gap and over the established/deployed barrier, for example, into an area aft of the barrier when standing on the forward side of the deployed barrier, and vice versa.

FIGS. 3A, 3B, 3C further show aircraft cabin barrier second component 132 comprising a barrier second component first vertical end 132c (referred to equivalently herein as a barrier second component first vertical "edge" 132c), and a barrier second component second vertical end 132d (that is equivalently referred to herein as the barrier second component hinged end, or barrier second component second vertical "edge" 132d). As shown in FIG. 3B, aircraft cabin barrier second component second vertical end 132d is configured to be in movable communication with monument 112d (e.g., a communication that can be, for example, a hinged communication, etc.) such that aircraft cabin barrier second component 132 can be hingedly attached to monument component 112d and can pivot laterally about, for example, a cooperatively hinged assembly 133 (referred to equivalently herein as a "hinge" 133, that can be in the form of one or more additional fasteners, or that can be an integral hinge or hinged region, etc.).

The aircraft cabin barrier second component first vertical end 132c can be moved/deployed from a stowed position adjacent to monument wall 115 toward a deployed position pivoted outwardly and away from monument wall 115 in the direction of "arrow" and toward a fully deployed position adjacent or in contact with galley monument wall 116 of monument 112b. The hinges or hinged regions can be configured to bend in a selected orientation to move and/or bend with respect to one another.

In another example, the aircraft cabin barrier second component 132 can be moved from a stowed configuration that is immediately adjacent to aircraft cabin monument wall 115 of aircraft cabin monument 112d such that aircraft cabin barrier second component 132 pivots, rotates, and/or "swings" (but does not move about a hinge) into a deployed position that is located in a position that will impede progress along aisle 106 that is adjacent the monument 112d.

FIGS. 3A, 3B, 3C further show aircraft cabin second barrier component 132 comprising cabin barrier second component first side 132e positioned against monument wall 115 when in the stowed position (shown in FIG. 3A); and cabin barrier second component second side 132f that remains exposed when in the stowed position (shown in FIG. 3A).

As shown in FIG. 3C, cabin barrier second component 132 is now in a fully deployed position or fully deployed "state" that is substantially perpendicular to aisle 106 and in a position as barrier second component of a hybrid barrier 140 (shown in FIG. 3E) formed by the placement of the galley cart 122 (as a barrier first component) in combination with the placement of the fully deployed aircraft cabin barrier second component 132 (shown also at least in FIG. 3E). The barrier first component (galley cart) and barrier second component taken together in combination to form the hybrid barrier 140 provide an obstacle preventing, restricting, etc., an unwanted passenger 10 from proceeding forward of the established and deployed hybrid barrier 140 that can be lockable and that prevents a passenger from moving along an aisle in a vehicle cabin and into a vehicle area (e.g., a vestibule area) forward of the lockable barrier.

FIGS. 3D and 3E are forward views from within an aircraft cabin of an aircraft of the type shown at least in FIG. 1A. FIG. 3D corresponds to the aircraft cabin barrier second component 132 in the stowed configuration and the position of the galley cart 122 as shown in FIG. 3A. FIG. 3E corresponds to the aircraft cabin barrier second component 132 in the fully deployed position and fully deployed configuration and the position of the galley cart 122 as shown in FIG. 3C, according to present aspects.

As further shown in FIGS. 3D and 3E, in one example, aircraft cabin barrier second component 132 comprises through-opening 134 extending from cabin barrier second component first side 132e to cabin barrier second component second side 132f permitting visual access through aircraft cabin barrier second component 132 (e.g., visual access into areas forward of the deployed barrier 140 from a position that is aft of the deployed barrier, and vice versa. A transparent window can occupy the through-opening.

FIGS. 3A, 3B, 3C, 3D, and 3E illustrate an aircraft cabin barrier second component in the form of a panel that can be an opaque panel made from a material that is robust enough to provide an impediment to through passage through the second component by, for example, and unwanted passenger, etc. Present aspects contemplate the use of any suitable material that meets the standard of required robustness, with cost and weight being possible factors in material choice. Suitable materials can include materials that can be self-supporting materials including, for example, a plastic, a composite material, a fabric, etc.

Although not visible in FIGS. 3A, 3B, 3C, FIGS. 3D and 3E show the third component of the established present hybrid barrier: a frame 136 configured to engage the top of the galley cart, with the frame 136 further engaging the aircraft cabin barrier second component, according to present aspects. That is, present aspects contemplate the hybrid barrier further comprising a frame that can extend from a stowed position adjacent a monument to a deployed position that engages the galley cart and that can include a lockable mechanism, such that the engagement of the frame to the galley cart maintains the galley cart in stationary and substantially fixed position. The frame is further configured to engage with the cabin barrier second component second horizontal end (e.g., bottom, or lower second component end referred to equivalently herein as a bottom, or lower second component "edge"), such that the frame is configured to engage both the galley cart and the barrier second component. In one example, the frame can be integral with the barrier second component.

In addition, present aspects contemplate the formation of an aircraft cabin hybrid barrier that can comprise a galley cart in combination with a aircraft cabin barrier second component, with a securing and/or stabilizing deployable frame in communication with the galley cart, and with the aircraft cabin barrier second component formed by deploying more than one outwardly extending members that can be fixedly and movably attach to an aircraft cabin monument at a cabin barrier second component first end and that can deploy from a stowed position adjacent to a monument wall surface to a deployed position extending outwardly lengthwise and configured to extend across an aircraft aisle width to prevent an unwanted person from moving along an aisle in a vehicle cabin and into a vehicle area forward of the deployed hybrid barrier.

FIGS. 4A and 4B show view of a hybrid barrier comprising a cabin first component in the form of a galley cart deployed into an aircraft aisle in combination with a deployable aircraft cabin barrier second component and a deployable frame configured to engage the deployed barrier first (galley cart) and second components to form the hybrid barrier. FIG. 4A is a forward view from within an aircraft cabin along an aircraft cabin aisle that is, at one location along the aisle, bounded by aircraft cabin monuments 112d, 112b. According to one present example, aircraft cabin barrier second component 132 is shown in FIGS. 4A and 4B in the stowed position that can be adjacent to monument wall 115 of monument 112d. Second barrier component 132 is shown as a plurality of stowed barrier second component members 137 (that together form the barrier second component 132) with the barrier second component members 137 movably attached to an outer surface of monument 112d, for example, that is proximate to the aisle.

FIG. 4B is an outboard view from within an aircraft cabin vestibule 120 of a cabin area, with the view toward monument 112d. Passenger 10 is shown facing forward in the aircraft in a position approaching the area between monuments 112d, 112b, with galley cart 122 in a deployed position within the aisle and deployed as the cabin barrier first component (e.g., the lower component) of the eventual hybrid barrier that will be formed with the deployment and engagement to the galley cart of the cabin barrier second component and the frame that will join and be located between the cabin barrier first and second components. FIGS. 4A and 4B further show frame 136 in a stowed position that is adjacent monument 112d, with frame 136 further comprising locking mechanisms 136a that can be one-quarter (¼) turn latches 136b. Frame 136 further comprises frame end 136c attached to or otherwise in movable communication with monument wall 115 with a range of motion afforded to the frame from deployed and stowed position (of the frame) via, for example a hinge 136d connecting frame 136 to monument wall 115.

According to present aspects, when the cabin barrier second component 132 comprises a plurality of barrier second component members 137 that can extend outwardly from a stowed position toward a deployed position, second component members in combination together form the aircraft cabin barrier second component 132.

FIG. 5A is a forward view from within an aircraft cabin along an aircraft cabin aisle that is, at one location along the aisle, bounded by aircraft cabin monuments 112d, 112b. FIG. 5A shows aircraft cabin barrier second component 132 comprising a plurality of cabin barrier second component members 137 that deploy from a stowed position to a deployed position as outwardly extending members movably attached at one end to monument 112d. As shown in FIG. 5A, "arrows" indicate the "downward" direction of movement of the cabin barrier second component members 137 from the stowed position rotated "downward" about an attachment point configured to allow the members 137 a range of motion between a stowed and deployed position, and that can releasably lock into a deployed position.

FIG. 5A further shows the galley cart 122 in a deployed position within the area of the aisle located between monuments 112d and 112b. In the deployed position, the galley cart becomes the aircraft cabin barrier first (lower) component, and can be held in position by frame 136 that is shown in FIG. 5A as deployed from a stowed position to a deployed position brought into contact with galley cart 122 and lockably engaged to galley cart 122 via locking mechanism 136a that can comprise and otherwise incorporate a one-quarter turn latch, for example. As shown in FIG. 5A, taken together in their deployed configurations positioned within the aisle, the galley cart 122, engaged with frame 136 in combination with the cabin barrier second component 132 (comprising the component members 137) together form the barrier 142 in the fully deployed and "completed" state that is referred to equivalently herein as the "hybrid barrier".

FIG. 5B is an outboard view from within an aircraft cabin vestibule 120 of a cabin area, with the view toward monument 112d. Passenger 10 is shown facing forward in the aircraft in a position approaching the area between monuments 112d, 112b, with barrier 142 in the fully deployed position with the aisle located between monuments 112b, 112d with the barrier configured to prevent an unwanted person, such as passenger 10 from moving along an aisle in a vehicle cabin into a vehicle area forward of the deployed and lockable barrier 142.

According to present aspects, when the galley cart is deployed to be positioned/configured as a barrier component of the hybrid barrier, as explained herein, the galley cart engages the frame 136. In the deployed and locked position, the frame is responsible for securely positioning the galley cart within an aisle. In addition, the galley cart brake can also be employed to further retain the galley cart in a desired stationary position within the aisle, and to further facilitate the galley cart's function as a portion of the present hybrid barrier. As shown at least in FIG. 5B, galley cart 122 further comprises a galley cart brake assembly 122a that can be engaged and disengaged (e.g., by an attendant) by, for example, engaging and releasing brake pedal 122b.

FIG. 5C is an overhead partial view of an aircraft cabin area of an aircraft 100 with the barrier 142 fully deployed and with deployed barrier 142 comprising the deployed cabin barrier first component (galley cart) 122, the deployed cabin barrier second component 132 (comprising the plurality of deployed second component members 137, and the deployed frame 136.

In one example, the galley cart 122 can be a galley cart in present operation on an aircraft, with the galley cart 122 dimensioned to fit within galley monuments in a stowed configuration when not in use. Galley carts can be dimensioned as full and half-size galley carts. In certain present aspects, the galley cart dimensions (e.g. length and width) relative to aisle dimensions (e.g., aisle widths can allow for the galley cart to be deployed as the aircraft cabin barrier first (lower) component part of the hybrid barrier with the deployed galley cart positioned lengthwise within an aisle such that the length of the galley cart is parallel to the direction of the aisle. In other examples, if the length dimension of the galley is less than an aisle width, (as shown in FIGS. 6A, 6B, 7A, 7B) the galley cart can be deployed as the barrier first (lower) component of the hybrid barrier with the length of the galley cart deployed into a barrier first component position that is perpendicular to the aisle direction.

FIG. 6A is a forward view from within an aircraft cabin along an aircraft cabin aisle that is, at one location along the aisle, bounded by aircraft cabin monuments 112d, 112b, and shows a deployed hybrid barrier similar to that shown in FIG. 5A, with the exception that the deployed cabin barrier first component (e.g., the deployed galley cart) is shown with the length of the galley cart positioned perpendicular to the aisle direction, and taking up more of the space in the aisle that does the galley cart as shown in FIG. 5A.

FIG. 6B is an outboard view from within an aircraft cabin vestibule 120 of a cabin area, with the view toward monument 112d. Passenger 10 is shown facing forward in the aircraft in a position approaching the area between monuments 112d, 112b. FIG. 6B further shows the fully deployed barrier of the type shown in FIG. 6A (but from an outboard view) with the length of the galley cart positioned perpendicular to the aisle direction. Barrier 142 is in the fully deployed position with the aisle located between monuments 112b, 112d, with the barrier configured to prevent an unwanted person, such as passenger 10 from moving along an aisle in a vehicle cabin into a vehicle area forward of the deployed and lockable barrier 142.

FIGS. 7A and 7B are similar to FIGS. 6A, 6B, except that the dimension of the galley cart shown in FIGS. 7A and 7B can correspond to dimension of so-called "half-size-carts", with FIGS. 7A and 7B illustrating that, according to present aspects the dimensions of "half-size-cart" galley carts are sufficient to satisfy the goals of the present hybrid barriers. Accordingly, as shown in FIGS. 7A and 7B galley cart 122 that can be a half-size-cart can fully deploy as a useful aircraft cabin barrier first component and be configured to engage with deployed frame 136; and together the deployed frame, barrier second component 137 and deployed barrier first component (galley cart) form fully deployed barrier 142, with deployed barrier 142 configured to prevent an unwanted person, such as passenger 10 from moving along an aisle in a vehicle cabin into a vehicle area forward of the deployed and lockable barrier 142.

FIG. 8 shows block diagram further illustrating present aspects where a vehicle 100 that can be in the form of an aircraft comprises an interior area 102 within a fuselage that contains an operation center 110 that can be, for example, a flight deck when the vehicle is in the form of an aircraft. The vehicle further comprises a main cabin area 103 that further comprises aircraft cabin monuments that, when configured into an assembly, form a barrier that can be a secondary barrier, with the barrier formed into an aircraft cabin lockable barrier to prevent passengers from moving along an aisle in a vehicle cabin into a vehicle area forward of the lockable barrier. Within vestibule 120, hybrid barrier 140, 142 comprise galley cart 122 that be of a selected dimension and that can be of a standard dimension or dimensions typically encountered in and supplied to present aircraft, with the galley cart 122 configured into the deployed cabin barrier first (lower) component as disclosed herein. Hybrid barrier further comprises the cabin barrier second (upper) component and deployable frame 136 that is configured to engage the deployed galley cart.

FIG. 9 is a flowchart illustrating a method 200 of controlling movement of passengers along an aisle within an aircraft cabin area, with the method including, prior to opening a flight deck door, moving 202 a barrier to a closed position with a flight deck being on a first side of the barrier and a passenger section of the cabin area being on a second side of the barrier. The barrier further includes an aircraft cabin barrier first (lower) component in the form of a galley cart repurposed or comprising the dual purpose of also converting into an aircraft cabin hybrid barrier. The barrier further includes an aircraft cabin barrier second component and a frame configured to engage the aircraft cabin barrier first component (galley cart) to form the hybrid barrier. The method further includes locking 204 the barrier in the closed position, and after locking the barrier, opening 206 the flight deck door and providing access to flight personnel to a front section of the cabin area, with the front section of the cabin area located at the first side of the barrier, and, after providing access to the front section of the cabin area to the flight personnel, reclosing 208 the flight deck door. Method 200 further optionally comprises moving 210 the barrier from a deployed and established barrier position to an open position, and returning the barrier components to their original barrier component positions as parts of existing aircraft cabin monuments In another aspect, FIG. 10 illustrates a method 300 including the features of method 200, (shown in FIG. 9) and further including monitoring 302 a position of the barrier with the barrier components comprising elements of a monitoring circuit that can send a signal to, for example, a controller that can receive the signal indicating that the monument components have been assembled into a barrier configuration as a barrier that can further monitoring that the barrier has been locked. Method 300 further includes activating/actuating 304 an indicator that can receive a signal from a controller and/or from the monitoring circuit to provide a visually detected confirmation that the barrier has been successfully established into a closed position and, if desired locked into the closed barrier position.

FIG. 11 is a flowchart outlining a method for flight crew to employ the presently disclosed hybrid barriers configured, for example, as secondary barriers, to prevent entry of unwanted persons from an aircraft cabin section toward spaces located forward of the established barrier including, for example, a flight deck. As shown in FIG. 11, method 400 comprises an initial scenario with flight crew needing to leave the flight deck 402, and flight crew calling 404 an attendant alerting attendant of needing to leave the flight deck. After checking to confirm that a lavatory is unoccupied, the flight attendant begins the process of deploying the barrier first component (galley cart) from its primary use as a galley cart 406 to the dual purpose use of the galley cart as a hybrid barrier component of the hybrid barrier. Method 400 further comprises, depending upon the cabin configuration, continuing the deployment of the hybrid barrier by deploying 408 the barrier second (upper) component and frame to a position over and otherwise adjacent the galley cart and engaging (and locking) the frame onto the galley cart.

Once the barrier is established into a deployed configuration, according to present aspects, method 400 further comprises notifying 410 flight crew that the barrier is established, followed by flight crew leaving 412 the flight deck. Upon returning 414 to the flight deck, method 400 comprises disengaging 416 the hybrid barrier and stowing the barrier second (upper) component and returning 418 the galley cart to a stowed configuration, for example, into a galley monument.

According to present aspects, the barrier that is established can act as a secondary barrier to inhibit a person that is in the passenger section of aircraft 100 from moving into the vestibule 120 and into the flight deck 110. In some examples, the barrier functions to slow the movement of the person into the vestibule 120. The barrier causes a time delay for unwanted passenger entry into areas forward of the deployed and established barrier as it requires the unwanted person to break the barrier or otherwise move the barrier to the open position. This time delay provides for flight personnel to move into the flight deck 110 and secure the flight deck door 110a. The flight deck door 110a is more secure than the barrier and may prevent the person from reaching the flight deck 110.

According to present aspects, the aircraft 100 can be equipped with a barrier monitoring system 500 as illustrated in FIGS. 12 and 13. As shown in FIGS. 12 and 13, the monitoring system 500 receives signals from a sensor 512 at the flight deck door 110a and a sensor 510 at the barrier 140. The monitoring system 500 provides flight personnel in the flight deck 110 the status of the flight deck door 110a and the barrier. This prevents the flight deck door 110a from being opened when the barrier is in the open position. The sensor 510 senses the position of the barrier and sensor 512 senses the position of the flight deck door 110a, that can be a locked position as flight deck door lock 110b is engaged. A control unit 501 receives signals from the sensors 510, 512 and monitors the positioning. An indicator 509 such as a light or audible alarm is positioned in the flight deck 110. Prior to opening the flight deck door 110a, the flight personnel checks the status of the barrier. If the barrier is in the closed position, the flight deck door 110a can be opened. This provides for the flight personnel to access the vestibule 120 of the cabin area 103, such as to use the lavatory. If the barrier is in the open position, the flight deck door 110a remains closed. This prevents a person that may be in the vestibule 120 from gaining access to the flight deck 110.

In some examples, control unit 501 controls the lock 540 on the flight deck door 110a. The control unit 501 maintains the lock 540 engaged when the barrier is in the open position. The control unit 501 disengages the lock 540 and allows it to be opened when the barrier 140 is closed.

The control unit 501 monitors the status and operation of the flight deck door 110a. As illustrated in FIG. 13, the control unit 501 includes processing circuitry 502 and memory circuitry 503. The processing circuitry 502 controls overall operation of the monitoring according to program instructions stored in the memory circuitry 503. The processing circuitry 502 can include one or more circuits, microcontrollers, microprocessors, hardware, or a combination thereof. Memory circuitry 503 includes a non-transitory computer readable storage medium storing program instructions, such as a computer program product, that configures the processing circuitry 502 to implement one or more of the techniques discussed herein. Memory circuitry 503 can include various memory devices such as, for example, read-only memory, and flash memory.

The control unit 501 includes communication circuitry 508 that provides for communication functionality with the sensors 512, 510. The communication circuitry 508 can provide for one-way communications from the sensors 512, 510 or two-way communications that are both to and from the sensors 512, 510. The control unit 501 can also communicate with other systems on the aircraft 100, such as a flight control system that controls the operations of the aircraft during flight.

A user interface 504 provides for flight personnel to monitor the status. The user interface 504 can include one or more input devices 506 such as but not limited to a keypad, touchpad, roller ball, and joystick. The user interface 504 can also include one or more displays 505 for displaying information. Displays 505 can be positioned in one or more of the flight deck 110 and vestibule 120.

The indicator 509 provides for a visual and/or audible indication of the status of one or both of the flight deck door 110 and barrier 140. The indicator 509 can be a separate device, or can be incorporated within the user interface 504, such as a display icon on a display 505.

In one example, the lock 540 includes a metallic strip that extends along one of the outer sides (e.g., lateral side). The lock 540 also includes an electromagnetic locking device that engages with the metallic strip when the barrier is in the closed position to secure the position. Flight personnel can unlock the lock 540 from the front side and allow for moving the barrier 140 to the open position. In the event of a power outage, the lock 540 is configured to disengage to provide for moving the barrier 140 to the open position. While barrier 140 is denoted in FIG. 12, the monitoring system 500 and control unit 501 shown in FIGS. 12, 13 can be used to monitor the status of the barrier position of any of barriers 140, 142 or barrier components 122, 132, 137, 136 described herein.

While the aircraft cabin barrier second component can be single panel or a single outwardly extending member having a selected broad dimension, present aspects contemplate any practical number of panels or outwardly extending members, (e.g., bars, rods, reinforced screens, reinforced fabric, etc.) comprising, for example multi-segment panels and/or outwardly extending members that can include two, three, for, five, six, etc. panels and/or two, three, for, five, six, etc. outwardly extending members, with design considerations including weight and cost of the additional segments employed and the robustness of the deployed panels and/or outwardly extending members to provide a useful barrier, and that, together with the frame and galley cart form the barrier that can be a secondary barrier, to prevent passengers from moving along an aisle in a vehicle cabin into a vehicle area forward of the deployed barrier that can be a lockable and retractable barrier.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

While a vehicle in the form of an aircraft is illustrated in the present FIGS., the present aspects can be incorporated to provide the improved barrier incorporating the deployable aircraft cabin lavatory monument component in a passenger vehicle including an aircraft, a rotorcraft, a marine vehicle, a terrestrial vehicle, a hovercraft, and combinations thereof.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:
1. An aircraft cabin barrier comprising:
an aircraft cabin galley cart;
an aircraft cabin barrier second component, said aircraft cabin barrier second component movably attached at one end to an aircraft cabin monument, said aircraft cabin monument positioned adjacent to an aisle, said aircraft cabin barrier second component movable between a stowed state and a deployed state, said aircraft cabin barrier second component comprising a first side and a second side;
a frame, said frame comprising a frame end, said frame end movably attached to the aircraft cabin monument, said movable frame movable between a stowed state and a deployed state, said frame in the deployed state configured to engage with aircraft cabin galley cart to form the aircraft cabin barrier; and wherein said aircraft cabin barrier second component in the stowed state is configured to rest substantially within an aircraft cabin monument footprint.

2. The aircraft cabin barrier of claim 1, wherein the aircraft cabin barrier second component further comprises an aircraft cabin barrier second component through-opening extending through a thickness of the aircraft cabin barrier second component from the aircraft cabin barrier second component first side to the aircraft cabin barrier second component second side.

3. The aircraft cabin barrier of claim 1, wherein the aircraft cabin monument is at least one of a galley wall, a lavatory wall, a partition wall, and a closet wall.

4. The aircraft cabin barrier of claim 1, wherein the frame is integral with the aircraft cabin barrier second component.

5. The aircraft cabin barrier of claim 1, wherein the frame in the deployed state is configured to engage the aircraft cabin galley cart to control passage of a person along an aircraft cabin aisle.

6. The aircraft cabin barrier of claim 1, wherein said aircraft cabin barrier second component in the deployed state is configured to rest outside of the aircraft monument footprint.

7. The aircraft cabin barrier of claim 1, wherein the aircraft cabin barrier second component comprises an aircraft cabin barrier second component vertical first end and further comprises an aircraft cabin barrier second component vertical second end, said aircraft cabin barrier second component vertical first end hingedly attached to the aircraft cabin monument, said aircraft cabin barrier second component configured to pivot about the aircraft cabin barrier second component vertical first end to move between the stowed state and the deployed state.

8. The aircraft cabin barrier of claim 1, wherein the frame is extendible to a plurality of frame lengths.

9. The aircraft cabin barrier of claim 1, wherein the frame in the deployed state is configured to maintain the aircraft cabin galley cart in a substantially fixed location.

10. The aircraft cabin barrier of claim 1, wherein at least one of said aircraft cabin barrier second component first side and said aircraft cabin barrier second component second side comprises a locking mechanism to engage with the frame.

11. The aircraft cabin barrier of claim 10, wherein the locking mechanism comprises a one-quarter turn latch.

12. An aircraft comprising the aircraft cabin barrier of claim 1.

13. An aircraft cabin monument comprising:
an aircraft cabin monument wall, said aircraft cabin monument wall comprising:
a movable aircraft cabin barrier component, said movable aircraft cabin barrier component movably attached at a movable aircraft cabin barrier component end to the aircraft cabin monument wall, said aircraft cabin monument wall positioned adjacent to an aircraft cabin aisle, said movable aircraft cabin barrier component comprising a movable aircraft cabin barrier component stowed state and a movable aircraft cabin barrier component deployed state, said movable aircraft cabin barrier component comprising a movable aircraft cabin barrier component first side and movable aircraft cabin barrier component second side;
a frame, said frame movably attached at a frame end to the aircraft cabin monument wall, said frame configured to move between a frame stowed state and a frame deployed state, said frame in the frame deployed state further configured to engage with a galley cart, said frame in the frame deployed state further configured to engage with said movable aircraft cabin barrier component to form an aircraft cabin barrier; and
wherein the movable aircraft cabin barrier component comprises an aircraft cabin barrier component vertical first end and further comprises an aircraft cabin barrier component vertical second end, said aircraft cabin barrier component vertical first end hingedly attached to the aircraft cabin monument, said movable aircraft cabin barrier component configured to pivot about the movable aircraft cabin barrier component vertical first end to move between the frame stowed state and the frame deployed state.

14. The aircraft cabin monument of claim 13, wherein the movable aircraft cabin barrier component further comprises an aircraft cabin barrier component through-opening extending through a thickness of the movable aircraft cabin barrier component from the movable aircraft cabin barrier component first side to the movable aircraft cabin barrier component second side.

15. The aircraft cabin monument of claim 13, wherein the movable aircraft cabin barrier component is integral with the frame.

16. The aircraft cabin monument of claim 13, wherein the frame comprises a locking mechanism to engage with the galley cart, said locking mechanism comprising a one-quarter turn latch.

17. An aircraft comprising the aircraft cabin monument of claim 13.

18. A method of controlling movement of passengers along an aisle within an aircraft cabin area, the method comprising:
prior to opening a flight deck door, moving a barrier to a closed position with a flight deck being on a first side of the barrier and a passenger section of the aircraft cabin area being on a second side of the barrier, the barrier comprising a lock, the barrier comprising:
an aircraft cabin galley cart;
a movable aircraft cabin barrier second component, said movable aircraft cabin barrier second component movably attached at one end to an aircraft cabin monument, said aircraft cabin monument positioned adjacent to an aisle, said movable aircraft cabin barrier second component comprising a stowed state and a deployed state, said movable aircraft cabin barrier second component further comprising a first side and a second side;
a movable frame, said movable frame movably attached at one end to the aircraft cabin monument, said movable aircraft cabin frame movable between a stowed state and a deployed state, said movable frame in the deployed state configured to engage with the movable aircraft cabin galley cart, said movable frame in the deployed state further configured to engage the movable aircraft cabin barrier second component to form an aircraft cabin barrier;
locking the barrier in the closed position;
after locking the barrier, opening the flight deck door and providing access to flight personnel to a front section of the cabin area, said front section of the cabin area located at the first side of the barrier; and after providing access to the front section of the cabin area to the flight personnel, reclosing the flight deck door;
monitoring a position of the barrier; and
activating an indicator in the flight deck when the barrier is in the closed position.

* * * * *